US011417076B2

(12) United States Patent
Kerofsky et al.

(10) Patent No.: US 11,417,076 B2
(45) Date of Patent: Aug. 16, 2022

(54) DETECTING A SUB-IMAGE REGION OF INTEREST IN AN IMAGE USING PILOT SIGNALS

(71) Applicant: QUALCOMM Incorporated, San Diego, CA (US)

(72) Inventors: Louis Joseph Kerofsky, San Diego, CA (US); Michael Stefanick, San Diego, CA (US); Mikko Juhani Palatsi, San Diego, CA (US); Deepankar Katyal, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/301,268

(22) Filed: Mar. 30, 2021

(65) Prior Publication Data
US 2022/0067415 A1 Mar. 3, 2022

Related U.S. Application Data

(60) Provisional application No. 63/073,280, filed on Sep. 1, 2020.

(51) Int. Cl.
G06V 10/22 (2022.01)
G06Q 30/02 (2012.01)
H04N 1/32 (2006.01)
G06V 10/44 (2022.01)
G06V 10/56 (2022.01)

(52) U.S. Cl.
CPC ......... *G06V 10/22* (2022.01); *G06Q 30/0248* (2013.01); *G06V 10/44* (2022.01); *G06V 10/56* (2022.01); *H04N 1/32267* (2013.01)

(58) Field of Classification Search
CPC ........ G06V 10/22; G06V 10/44; G06V 10/56; G06Q 30/0248; H04N 1/32267
See application file for complete search history.

(56) References Cited

U.S. PATENT DOCUMENTS

| 8,825,518 | B2 | 9/2014 | Levy |
| 10,257,567 | B2 | 4/2019 | Petrovic et al. |
| 2006/0280246 | A1* | 12/2006 | Alattar .................. G06T 1/0085 375/240.2 |

FOREIGN PATENT DOCUMENTS

WO 2016156513 A1 10/2016

OTHER PUBLICATIONS

International Search Report and Written Opinion—PCT/US2021/046168—ISA/EPO—dated Nov. 29, 2021, 12 pp.
(Continued)

*Primary Examiner* — Christopher Wait
(74) *Attorney, Agent, or Firm* — Shumaker & Sieffert, P.A.

(57) ABSTRACT

An example device for processing image data includes a memory configured to store an image; and one or more processors implemented in circuitry and configured to: process the image to identify a pilot signal in the image indicating a portion of the image, the pilot signal forming a boundary around the portion and having pixel values defined according to a mathematical relationship with pixel values within the portion such that the pilot signal is not perceptible to a human user and is detectable the device; determine the portion of the image using the pilot signal; and further process the portion to attempt to detect one or more contents of the portion without attempting to detect the one or more contents of the image in portions of the image outside the portion.

39 Claims, 20 Drawing Sheets

(56) References Cited

OTHER PUBLICATIONS

"Digital Signature Standard (DSS)", Federal Information Processing Standards Publication, FIPS PUB 186-4, Jul. 2013, 130 Pages.
"Digital Signature Standard (DSS)", Federal Information Processing Standards Publication, FIPS PUB 186-5 (Draft), Oct. 2019, 87 Pages.
MOAT: "Moat Analytics: Description of Methodology", Brand Intelligence and Analytics, Nov. 2014, pp. 1-3.
"Oracle Exposes "DrainerBot" Mobile Ad Fraud Operation", Redwood City, CA, Feb. 20, 2019, pp. 1-5, https://www.oracle.com/corporate/pressrelease/mobilebot-fraud-operation-022019.html.
Paul R.T., "Review of Robust Video Watermarking Techniques", IJCA Special Issue on "Computational Science—New Dimensions & Perspectives" NCCSE, 2011, pp. 90-95.
Wikipedia, "Zadoff-Chu Sequence", Jan. 14, 2021, pp. 1-4, https://en.wikipedia.org/wiki/Zadoff-Chu_sequence [retrieved on Sep. 1, 2021].
IAB "What Is An Untrustworthy Supply Chain Costing The U.S. Digital Advertising Industry?," retrieved from https://www.iab.com/insights/what-is-an-untrustworthy-supply-chain-costing-the-u-s-digital-advertising-industry/, Dec. 1, 2015, 3 pp.

\* cited by examiner

DETECTING A SUB-IMAGE REGION OF INTEREST IN AN IMAGE USING PILOT SIGNALS

This application claims the benefit of U.S. Provisional Application No. 63/073,280, filed Sep. 1, 2020, the entire contents of which are hereby incorporated by reference.

TECHNICAL FIELD

This disclosure relates to processing of image data, including processing of still image data and/or video data that is streamed over a network.

BACKGROUND

Many techniques are available for analysis and understanding of images. These range from image and object detection to watermarking and steganography. Some applications require analysis of a sub-region of an image. For instance, the image presented to a frame display buffer may be composed from several different components. For example, a computing device may construct a final image from three components originating from a web browser, video data, and a still image.

Advertisements are used to generate revenue for various media streaming operations. In general, an advertiser is charged when their content is delivered to a user device. Advertisement fraud is a common digital advertising problem. In general, fraud is committed upon an advertiser when the advertiser is charged without presentation of an advertisement. Fraud can impact millions or even billions of dollars in revenue for advertisers.

One challenge in validating display of digital advertising is confirming that ad content reached the viewer. With web content, a pay-per-click model is one approach to confirm some level of user interactivity. However, it is also important to verify that non-interactive digital content is displayed to a user. Content may be present on a web page, for example, but may not displayed in a visible manner. A first example is that the content may be 'below the fold,' that is, presented in a region of a web page that is not actually displayed to the viewer, despite being delivered to the viewer. In such cases, an advertiser may be charged for content that was never seen. Alternatively, the content may be delivered and displayed but obscured due to rendering. A technical challenge of this application is identifying the presence of a sub-image of interest withing a larger image, such as a full display buffer.

Traditional image analysis techniques operate on single images and videos, and hence, implicitly assume knowledge of the extent of the region of the image of interest. Complexity can be reduced, and algorithm performance increased if only a sub-image is processed, even when the analysis algorithm could operate on the entire image. In one example of display image verification, the verification is done on a composited image placed in a display buffer. This raises the challenge of identifying the location of sub-images within the composite image.

Another challenge related to digital advertising in image data, such as still image data and video data, is avoiding advertisement fraud. In general, advertisement fraud relates to illegitimate parties causing overcounting of displayed advertisements, thereby causing overcharging of advertisers.

Various such advertisement fraud mechanisms are possible. One fraud mechanism is the use of automated software, i.e., "bots." DrainerBot is an example of such automated software, so named by Moat Analytics of Oracle. In the example of Drainerbot, a rogue application running on a mobile device would continuously stream video to the device without displaying the result. According to a press release from Oracle:

> Oracle today announced the discovery of and mitigation steps for "DrainerBot," a major mobile ad fraud operation distributed through millions of downloads of infected consumer apps. Infected apps can consume more than 10 GB of data per month downloading hidden and unseen video ads, potentially costing each device owner a hundred dollars per year or more in data overage charges.
>
> DrainerBot was uncovered through the joint efforts of Oracle technology teams from its Moat and Dyn acquisitions. Now part of the Oracle Data Cloud, Moat offers viewability, invalid traffic (IVT), and brand safety solutions, while Dyn enables DNS and security capabilities as part of Oracle Cloud Infrastructure.

Oracle, "Oracle Exposes 'DrainerBot' Mobile Ad Fraud Operation," Press Release, Redwood City, Calif., Feb. 20, 2019, www.oracle.com/corporate/pressrelease/mobilebot-fraud-operation-022019.html.

Another fraud mechanism is where images and video are delivered to a client that are not seen due to final rendering that happens on a client device just prior to delivery to a display. In general, an image may not be included in the region sent to the display or may be occluded by other content. An example of this effect is produced by browsing on a mobile device to a web page including multiple elements. Orientation of the mobile device may cause occlusion or other disruption of advertisement presentation. In one example, a mobile device may be in the portrait mode with all sub-images being visible. However, when the same mobile device is rotated to landscape orientation, the page may be re-rendered based on the new orientation. In the landscape rendering, one sub-image may occlude a portion of a second sub-image including an advertisement. This example demonstrates that the actual viewability of a component of a page depends upon the rendering, among other aspects.

One conventional technique to prevent fraud in interactive media is a performance-based "pay-per-click" model, which requires that a user "click" to confirm that the content was seen. There are techniques to circumvent this, such as click farms.

Other conventional solutions for verifying visibility of advertisements are confined to a web browser or application at a client device. Standards for viewability are defined within the web browser and JavaScript on the client device can evaluate this viewability estimate and provide feedback to an advertiser about this level of viewability. For instance, the functionality of the 'Moat' viewability system is described in Moat Analytics, "Description of Methodology," s3.amazonaws.com/clients.assets/mrc_dom/MRC_DOM_11-2014. pdf:

> In-View Impression Methodology—Moat follows the IAB guidelines for counting in-view impressions: for display advertisements, 50% or more of the pixels of the ad must be visible on-screen for at least one continuous second. (Per IAB guidelines, a "30% of pixels" rule is applied for ads that are at least 242,500 pixels in size, including the 300×1050 and 970×250 formats.) The browser window must be active/in-focus, meaning the browser is not minimized and the page is not in a background tab. If the browser and another application are side-by-side, the page in the browser is still considered in-focus.

Moat tracks the ad itself when checking for viewability, not the container of the ad. In rare cases, when a rich media ad consists of multiple individual assets, Moat will track the ad container instead.

For video analytics, Moat follows the IAB guidelines for video viewable impressions and requires that at least 50% of the pixels of the player must be visible on-screen, the page must be focused, and the ad must be playing for at least two continuous seconds.

Moat employs a positional measurement technique that uses JavaScript to determine the position of the ad as well as proprietary browser-resource techniques to determine whether the ad is visible. If the Moat tag is on the page or inside one or more same-domain ("friendly") iframes, viewability is measured in all browsers including mobile browsers. If the tag is inside one or more cross-domain ("hostile") iframes, viewability is measured in Chrome, Firefox, Safari, and IE. Because Moat Analytics runs from within the browser and does not interface with external applications, it does not take into account non-browser applications when determining the viewability of the ad.

To determine whether an ad meets the time requirement for a viewable impression (one continuous second for display and two continuous seconds for video), Moat checks (aka "polls") the visibility of the ad every 200 ms. A viewable impression is counted if the ad is visible for five consecutive checks (10 checks for video ads). Although the MRC recommends that measurement providers poll at 100 ms intervals for display ads, Moat has shown through empirical evidence that the 200 ms methodology is equivalent in accuracy.

Measurement Requirements—Moat requires a user to have JavaScript enabled and to not use an ad blocker in order to measure an impression. These requirements are similar to the requirements for serving and displaying an ad.

SUMMARY

In general, this disclosure describes techniques for detecting sub-images of a larger image. These techniques may be used, for example, to determine whether an advertisement, including an image with the sub-image, is present in a display buffer of a device. If the sub-image is detected in a frame of the display buffer, the device can determine that the image, and therefore the advertisement, will be displayed to a user of the device.

These techniques may further be used to detect media advertisement fraud related to non-interactive content. For example, these techniques may be used to detect fraud related to when image and/or video data are presented without a user feedback event (e.g., a "click" on a link). These non-interactive ad fraud detection techniques may be particularly advantageous on mobile platforms.

In one example, a method of processing image data includes processing an image to identify a pilot signal in the image indicating a region of interest (ROI) of the image, the pilot signal forming a boundary around the ROI and having pixel values defined according to a mathematical relationship with pixel values within the ROI such that the pilot signal is not perceptible to a human user and is detectable by a computing device; determining the ROI of the image using the pilot signal; and further processing the ROI to attempt to detect one or more contents of the ROI without attempting to detect the one or more contents of the image in portions of the image outside the ROI.

In another example, a device for processing image data includes a memory configured to store an image; and one or more processors implemented in circuitry and configured to: process the image to identify a pilot signal in the image indicating a region of interest (ROI) of the image, the pilot signal forming a boundary around the ROI and having pixel values defined according to a mathematical relationship with pixel values within the ROI such that the pilot signal is not perceptible to a human user and is detectable by the device; determine the ROI of the image using the pilot signal; and further process the ROI to attempt to detect one or more contents of the ROI without attempting to detect the one or more contents of the image in portions of the image outside the ROI.

In another example, a device for processing image data includes means for processing an image to identify a pilot signal in the image indicating a portion of the image, the pilot signal forming a boundary around the portion and having pixel values defined according to a mathematical relationship with pixel values within the portion such that the pilot signal is not perceptible to a human user and is detectable by a computing device; means for determining the portion of the image using the pilot signal; and means for further processing the portion to attempt to detect one or more contents of the portion without attempting to detect the one or more contents of the image in portions of the image outside the portion.

In another example, a computer-readable storage medium has stored thereon instructions that, when executed, cause a processor to process an image to identify a pilot signal in the image indicating a portion of the image, the pilot signal forming a boundary around the portion and having pixel values defined according to a mathematical relationship with pixel values within the portion such that the pilot signal is not perceptible to a human user and is detectable by a computing device; determine the portion of the image using the pilot signal; and further process the portion to attempt to detect one or more contents of the portion without attempting to detect the one or more contents of the image in portions of the image outside the portion.

In another example, a method of processing image data includes determining pixel values of an image at a boundary around the image; and processing the image to add a pilot signal at the boundary around the image, the pilot signal having pixel values defined according to a mathematical relationship with the pixel values of the sub-image such that the pilot signal is not perceptible to a human user and is detectable by a computing device.

In another example, device for processing image data includes a memory configured to store data for an image; and one or more processors implemented in circuitry and configured to: determine pixel values of an image at a boundary around the image; and process the image to add a pilot signal at the boundary around the image, the pilot signal having pixel values defined according to a mathematical relationship with the pixel values of the sub-image such that the pilot signal is not perceptible to a human user and is detectable by a computing device.

In another example, device for processing image data includes means for determining pixel values of an image at a boundary around the image; and means for processing the image to add a pilot signal at the boundary around the image, the pilot signal having pixel values defined according to a mathematical relationship with the pixel values of the sub-image such that the pilot signal is not perceptible to a human user and is detectable by a computing device.

In another example, a computer-readable storage medium has stored thereon instructions that, when executed, cause a processor to determine pixel values of an image at a boundary around the image; and process the image to add a pilot signal at the boundary around the image, the pilot signal having pixel values defined according to a mathematical relationship with the pixel values of the sub-image such that the pilot signal is not perceptible to a human user and is detectable by a computing device.

The details of one or more examples are set forth in the accompanying drawings and the description below. Other features, objects, and advantages will be apparent from the description, drawings, and claims.

DETAILED DESCRIPTION

This disclosure generally relates to detection of sub-images within an image. A client device, such as a mobile device (e.g., a smart phone, tablet computer, personal computer, or the like) may assemble a rendered frame from multiple sub-elements. For example, the client device may obtain web browser data, image data, and video data, compose a final frame from these sets of data, and insert the final frame into a frame buffer. The client device may then detect sub-regions from the composite rendered display buffer.

Once the client device detects a particular Region of Interest (ROI) corresponding to a sub-image of the image in the frame buffer, the client device may perform an appropriate analysis algorithm to the ROI for object analysis and watermark extraction of the sub-image. The techniques of this disclosure may increase the effectiveness of the analysis algorithm by initially identifying the relevant ROI.

An additional challenge of processing a full image buffer rather than just ROIs of interest is complexity of processing. The techniques of this disclosure provide relatively lower complexity ROI/presence detection techniques. In this manner, the client device may perform a complex watermark extraction process only when the client device detects a candidate ROI and only on the reduced number of samples in the ROI. Thus, the client device may avoid performing the watermark extraction process continuously on the full image. Thus, these techniques may address problems related to how to identify the ROI of a specific content source when present in a combined rendered image.

Accordingly, this disclosure describes techniques for detecting a sub-image of a larger image intended for use in processing the sub-image, such as extracting a watermark or other aspect of interest. For example, these techniques may include adding and/or detecting one or more pilot signals in the content, where the client device may use the pilot signals to eventually form the sub-image of the composite display buffer.

Figure 1:
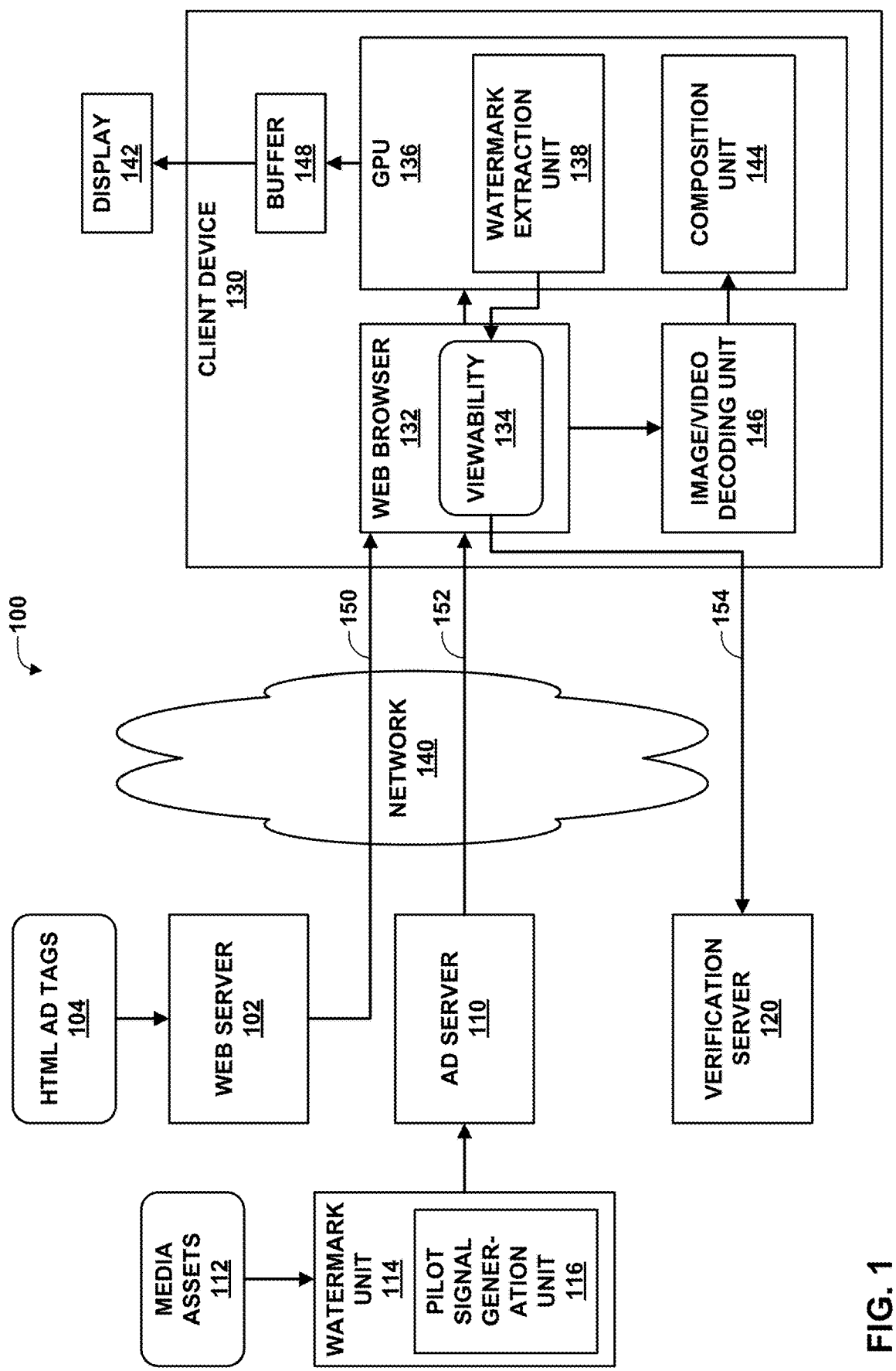
FIG. 1 is a block diagram illustrating an example system that may be configured to perform the techniques of this disclosure to use watermarks in images to detect advertisement (ad) fraud.

FIG. 1 is a block diagram illustrating an example system 100 that may be configured to perform the techniques of this disclosure to use pilot signals to indicate locations of sub-images, such as watermarks. Furthermore, client device 130 may be configured to use the watermarks to detect advertisement (ad) fraud, according to further techniques of this disclosure. In the example of FIG. 1, system 100 includes web server 102, ad server 110, verification server 120, client device 130, and network 140.

Network 140 represents a set of devices forming a network for exchanging data between web server 102, ad server 110, watermark unit 114, pilot signal generation unit 116, verification server 120, and client device 130. Network 140 may represent the Internet. In general, network 140 may include a variety of conventional network devices, such as routers, bridges, hubs, network security devices such as firewalls, servers, and the like.

In this example, web server 102 provides network content 150 to client device 130, e.g., using a networking protocol such as hypertext transfer protocol (HTTP), real-time transport protocol (RTP), multicast, broadcast, or other such protocols. In some examples, web server 102 may deliver content using layered application protocols, such as Dynamic Adaptive Streaming over HTTP (DASH), File Delivery over Unidirectional Transport (FLUTE), or ROUTE protocol. In this example, web server 102 receives hypertext markup language (HTML) advertisement (ad) tags 104 to be applied to web pages of network content 150. Web server 102 inserts HTML ad tags 104 into web pages of network content 150 for retrieval of appropriate ads from ad server 110. In some examples, HTML ad tags 104 may additionally include JavaScript code for retrieving corresponding ads from ad server 110, such that web server 102 may send data for web pages of network content 150 containing HTML ad tags 104 and the JavaScript code to client device 130.

Web server 102 may host web pages including links to ads hosted by ad server 110 and corresponding to HTML ad tags 104. These web pages may also include JavaScript code, or other such code executable by web browser 132, for validating the ads. Such validation code may be similar to validation code from Moat Analytics of Oracle, Integral Ad Science (IAS), Google Active View, or other validation processes.

In this example, ad server 110 provides advertisement media assets 112 to client device 130 via network 140. In particular, as noted above, web pages provided by web server 102 include HTML ad tags 104, which may correspond to sets of media assets 112. An advertiser may generate media assets 112 (e.g., images and/or video content) for advertisements. As explained in greater detail below, watermark unit 114 may mark media assets 112 to determine whether media assets 112 have in fact been displayed by client device 130. Moreover, in this example, watermark unit 114 includes pilot signal generation unit 116 to insert pilot signals around and/or in close proximity to watermarks, to aid in location and detection of the watermarks. In general, client device 130 may request ads 152 from ad server 110 corresponding to HTML ad tags 104. In some examples, client device 130 may execute corresponding JavaScript code for accessing the ads.

Watermark unit 114 may be configured, according to the techniques of this disclosure, to modify image and video content of media assets 112 to include a robust, invisible watermark. In this example, watermark unit 114 includes pilot signal generation unit 116. According to the techniques of this disclosure, pilot signal generation unit 116 may design and insert boundary pilot signals around the watermarks, or around other images or sub-images. In practice, pilot signal generation unit 116 may be configured to design pilot signals that are virtually imperceptible to human users, but still detectable by computing devices, such as client device 130. For purposes of explanation and illustration, however, the figures of this disclosure typically depict visual representations of the pilot signals, e.g., using dashed lines.

To survive though the content delivery chain as well as rendering, pilot signal generation unit 116 may design the pilot signals to be robust to distortions that may occur during content delivery and rendering, such as compression, downscaling, upscaling, color space conversion, and/or phase shifts (offset).

Watermark unit 114 may produce modified final ad content that can be handled by conventional media playing ecosystems. Additionally, JavaScript code or other code may be provided along with the ad content by ad server 110, web server 102, or verification server 120. Ad server 110 may provide the final ad content (including the watermark and/or boundary pilot signals) without necessarily having any accommodation for the presence of the watermark and/or boundary pilot signals.

Client device 130 in this example includes web browser 132, viewability unit 134, image/video decoding unit 146, graphics processing unit (GPU) 136, watermark extraction unit 138, buffer 148, and composition unit 144. Client device 130 generally receives media data from web server 102 and advertisements from ad server 110, and renders media data to be displayed on display 142. Web browser 132 and viewability unit 134 may be implanted in software and executed by one or more processors implemented in circuitry. GPU 136 may be implemented in circuitry, while watermark extraction unit 138 may be implemented in software, firmware, and/or hardware.

Buffer 148 represents a computer-readable storage medium, that is, a memory, which may be implemented using random access memory (RAM) or other storage media. Buffer 148 may also be referred to as a frame buffer. Buffer 148 may form part of GPU 136 or may be provided separately. In general, buffer 148 may store frames (that is, pictures) to be output to display 142.

Web browser 132 may retrieve a variety of different types of media, such as web pages, images, videos, and the like. In some examples, web browser 132 may retrieve a web page, one or more images (e.g., watermarked advertisements), and video data. Web browser 132 may provide the images and video data to image/video decoding unit 146, which may decode the images and video data. Web browser 132 may provide a web page to composition unit 144, and image/video decoding unit 146 may provide decoded images and video data to composition unit 144. Composition unit 144 may compose a final rendered image to be displayed on display 142. Composition unit 144 may store the final rendered image to buffer 148 for subsequent retrieval by and output to display 142.

As discussed above, conventional web browsers include viewability verification to determine whether advertisements have been displayed to a user. Viewability unit 134 performs conventional techniques for determining whether advertisements have been displayed. For example, viewability unit 134 may determine whether ads are active and/or in-focus on a displayed web page, to ensure that an advertisement image is not hidden. However, the conventional techniques do not guarantee that an advertisement image has actually reached display 142.

Visibility of an ad is impacted by an imaging pipeline and rendering, in addition to web page layout. Conventional solutions calculate visibility based on page layout and reports for a web browser. This disclosure describes techniques for using a trusted GPU, i.e., GPU 136, to determine whether an ad image was presented to display 142. Additionally, GPU 136 may provide confirmation to a remote server, e.g., verification server 120, through web browser 132 without modification of client device 130 other than GPU 136.

In general, web browser 132 may operate in a conventional manner except for interactions with GPU 136 and ad server 110/verification server 120. Web browser 132 may include an interface, such as an application programming interface (API), for communicating with GPU 136, to pass ad content to GPU 136. Web browser 132 may also be configured to submit report 154 to verification server 120. As discussed below, web browser 132 may receive a message from GPU 136 including a signature-verified extracted content identifier for an ad included in received ads 152 from ad server 110. During delivery, ads 152 may be compressed, transcoded, and/or scaled, which may distort images of ads 152 (which may affect pilot signals included in ads 152). Thus, pilot signal generation unit 116 may design the pilot signals to be robust to withstand such distortions. Web browser 132 may form report 154 to include a validation message including signed content from GPU 136, an expected content ID for ads 152, and/or other parameters of interest to a corresponding advertiser.

Verification server 120 is shown separately from ad server 110 in the example of FIG. 1, but may correspond to the same server in some examples. In general, verification server 120 receives report 154 from client device 130 indicating whether ads 152 were in fact sent to display 142. That is, using the techniques of this disclosure, GPU 136 may determine whether one or more of ads 152 were sent to display 142, and send data representing ads 152 sent to display 142 to viewability unit 134. Viewability unit 134, in turn, may generate report 154 indicating which of ads 152 were sent to display 142.

According to the techniques of this disclosure, watermark unit 114 may add digital watermarks to media assets 112, e.g., images and video data. To aid in detectability, pilot signal generation unit 116 may design and insert pilot signals around the digital watermarks. GPU 136 (and in particular, watermark extraction unit 138) may use the pilot signals to locate a sub-image (e.g., a watermark of an advertisement image) of a display buffer. Examples of image watermarking are described in Paul, "Review of robust video watermarking techniques." IJCA Special Issue on Computational Science, vol. 3, 2011, pp. 90-95.

Figure 2:
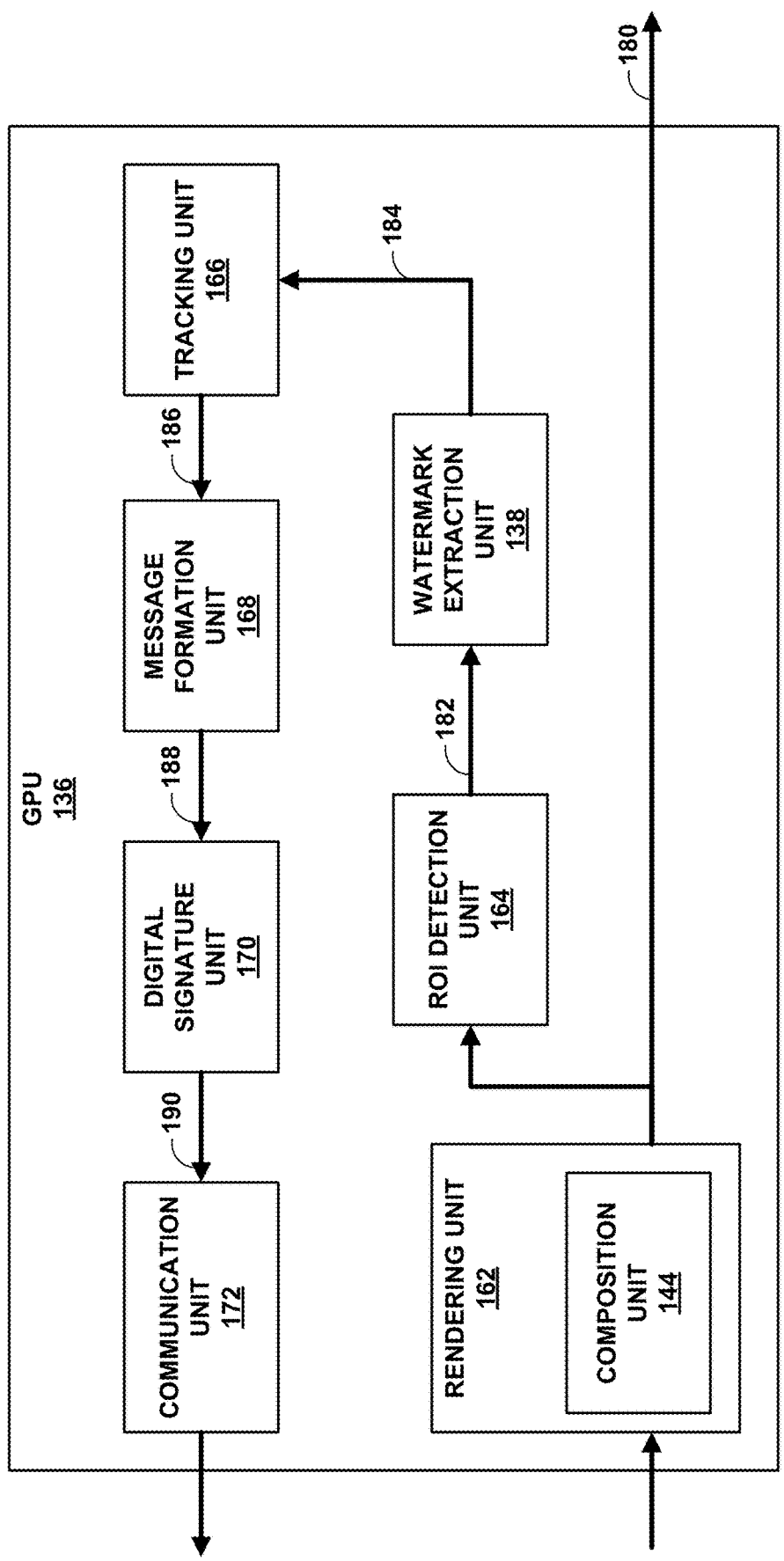
FIG. 2 is a block diagram illustrating an example set of components of a graphics processing unit (GPU) that may be used to perform the techniques of this disclosure.

Watermark extraction unit 138 may be configured to detect pilot signals and indicate a sub-image region of interest (ROI). As discussed in greater detail below, GPU 136 may include an ROI detection unit (as shown in FIG. 2, not shown in FIG. 1). GPU 136 (e.g., the ROI detection unit thereof) may be configured to use unknown scaling that may be applied to a sub-image prior to rendering and storage of a final image to buffer 148. Pilot signal generation unit 116 may design the pilot signals to include spatial frequency and color weights, which GPU 136 may use to detect the pilot signals and, as a result, the watermark indicated by the pilot signals. The design of the pilot signals may allow GPU 136 to detect the pilot signals despite compression, scaling, and other image processing that may occur between formation of an original media asset of media assets 112 and rendering by GPU 136 and composition unit 144 of a final image stored to buffer 148. GPU 136 may use the detected ROI within the pilot signals to supply a sub-image for subsequent processing, e.g., to watermark extraction unit 138.

Web browser 132 may generally correspond to a conventional web browser or may be further configured to pass watermarked images and video content to GPU 136 for rendering. Web browser 132 may execute JavaScript code in a conventional manner. Web browser 132 may retrieve web page data, image data (e.g., advertisement data), video data, and the like. Web browser 132 may provide compressed image data (e.g., still image data and/or video data) to image/video decoding unit 146. Image/video decoding unit 146 may decode the image data and provide decoded image data to composition unit 144. Composition unit 144 may form a final rendered image from the web page data, image data, and video data to buffer 148. Composition unit 144 may combine a variety of different assets into a single image for display.

In addition, GPU 136 may be configured, according to the techniques of this disclosure, to identify and extract watermarks from a frame buffer. GPU 136 may initially determine locations of pilot signals as discussed in greater detail below, which may outline the watermark. GPU 136 may then use watermark extraction unit 138 to extract the watermark. GPU 136 may read a content identifier from the watermark (which may be encrypted), and GPU 136 may track how long the watermark is visible (e.g., using a number of frames stored to buffer 148 and a display frame rate of display 142), to form a report on this visibility. The report may include the content identifier, the duration the content was seen, and optionally, a unique identifier associated with a user of client device 130. GPU 136 may also format and sign or encrypt this report or other response message. GPU 136 may provide the report or response message to viewability unit 134, which may execute instructions according to the techniques of this disclosure to forward report 154 to verification server 120.

GPU 136 may generate the validation message to include plain text data as follows:

Content Identifier: an integer value extracted from the watermark and reported back by the GPU. This identifies the content distinguishing it from any other content that may be present in the display buffer.

Duration: defines the amount of time in seconds, that the Content Identifier was detected in the display buffer by the GPU. This is calculated as the time between first encountering the content identifier and the first following frame which does not include the Content Identifier.

Client ID: a value unique to client device 130, such as GPU serial number, MAC address, or the like.

GPU ID: an index used to specify the key used to validate the digital signature used to sign the above fields for GPU 136.

GPU 136 may pass the validation message to web browser 132. Web browser 132 may add additional information to the validation message to form report 154 including a complete verification message to be sent to verification server 120. GPU 136 may generate separate messages for each watermark detected in a frame, or a single validation message including a list of detected content identifiers and durations.

Verification server 120 may receive report 154 including the verification message from viewability unit 134 and GPU 136. Verification server 120 may validate GPU 136, which generated data for report 154, against a list of trusted GPUs, either via decryption or via a digital signature. Verification server 120 may compare a content identifier reported by GPU 136 for equality with an identifier of ads 152 delivered to client device 130. In the case of a match, verification server 120 may associate the duration information included in report 154 with ads 152, and in some cases, an identifier of client device 130.

FIG. 2 is a block diagram illustrating an example set of components of GPU 136 of FIG. 1 that may be used to perform the techniques of this disclosure. In this example, GPU 136 includes rendering unit 162, composition unit 144, region of interest (ROI) detection unit 164, watermark extraction unit 138, tracking unit 166, message formation unit 168, digital signature unit 170, and communication unit 172.

Rendering unit 162 may be a traditional rendering unit that receives images and rendering commands, e.g., from web browser 132 (FIG. 1) and creates an image 180 for sending to a display (e.g., display 142 of FIG. 1) using typical GPU operations. For example, composition unit 144 may receive web page data, still image data (e.g., advertisement images), and video data, and compose an image from the web page data, still image data, and video data. Rendering unit 162 need not be specifically configured to interact with watermarks and/or pilot signals. Rendering unit 162 also sends image 180 to ROI detection unit 164.

ROI detection unit 164 scans image 180 to identify ROIs, such as ROI 182, containing watermarked regions. These regions may be indicated by a pilot signal around a boundary of the image (or sub-image) used to form ROI 182 containing a watermarked region. In addition to rendering imagery for display, GPU 136 may be configured to support a process to scan a rendered display buffer of pixels as the image is presented to display 142. ROI detection unit 164 may detect ROI 182, e.g., by detecting pilot signals describing a boundary of ad content of image 180. In some cases, efficiency may be taken advantage of, e.g., in the case that the frame buffer or ROI are unchanged, in which case the ROI detection and watermark extraction need not be performed again.

Watermark extraction unit 138 may receive data for ROI 182 from ROI detection unit 164. Watermark extraction unit 138 may decode content identifier 184 present in ROI 182. In some examples, watermark extraction unit 138 need not operate if contents of ROI 182 are unchanged for image 180 compared to a prior image for which the watermark was extracted. Watermark extraction unit 138 may provide content identifier 184 to tracking unit 166.

Tracking unit 166 may record the presence of the same extracted content identifiers over time and calculate a duration of time the content identifiers were present, to calculate a duration of visibility of content identifier 184. Tracking unit 166 may maintain a list of multiple extracted content identifiers and track durations of each of the extracted content identifiers individually. Tracking unit 166 may convert a number of consecutive frames/images containing content identifier 184 to an absolute measure, such as duration in seconds. Tracking unit 166 may generate data 186 representing each of the detected content identifiers and corresponding durations for which the content identifiers were visible. Tracking unit 166 may output data 186 to message formation unit 168 after one or more of the content identifiers is no longer detected, or tracking unit 166 may output data 186 periodically and/or upon request from message formation unit 168. In the case of panel self refresh (PSR) technology, which is designed to pause rendering and hold an image on display, tracking unit 166 may add the duration of the PSR to the duration of the content identifier(s) if GPU 136 is inactive during a PSR process.

Message formation unit 168 may form message 188 describing content identifiers detected in a display buffer using data 186. Message formation unit 168 may form message 188 to include a list of content identifiers (extracted from watermarks), durations the content identifiers (and thus, the corresponding ad content) were displayed, a current time, a device-specific identifier (ID), and motion information about the content identifier. Message formation unit 168 may provide message 188 to digital signature unit 170. Table 1 below represents an example message format for message 188.

TABLE 1

| FIELD | VALUE |
|---|---|
| Content ID | 545404223 |
| Duration (seconds) | 10 |
| Time Stamp | Sat Jul 23 02:16:57 2005 |
| Client ID | 0x499602D2 |

Digital signature unit 170 may generate a secure digital signature for message 188 and prepare signed message 190 including message 188 and the secure digital signature. Digital signature unit 170 may append the secure digital signature to message 188 to be used as verification of the validity of the contents of message 188. For example, digital signature unit 170 may encrypt message 188 with a private key associated with GPU 136 of a public key/private key pair, e.g., using RSA, and other parties may decrypt the digital signature using the corresponding public key to determine that message 188 is valid and authentic. Digital signature unit 170 may provide signed message 190 to communication unit 172.

Communication unit 172 provides communication with browser 132 of FIG. 1. In particular, web browser 132 may execute JavaScript code, for example, to receive signed message 190 from GPU 136 and to send signed message 190 to verification server 120 (FIG. 1). Two-way communication between GPU 136 and web browser 132 may be used if web browser 132 passes parameters to GPU 136, e.g., for signaling. Web browser 132 or an application may send commands to GPU 136 via communication unit 172 to start or stop scanning for watermarks. In some examples, web browser 132 may send commands to GPU 136 via communication unit 172 to receive a unique identifier to be used by digital signature unit 170 for signing message 188. One-way communication from GPU 136 to web browser 132 to supply validation messages asynchronously but use continuous operation or logic to control activation of the ROI search and watermark detection process.

Figure 3:
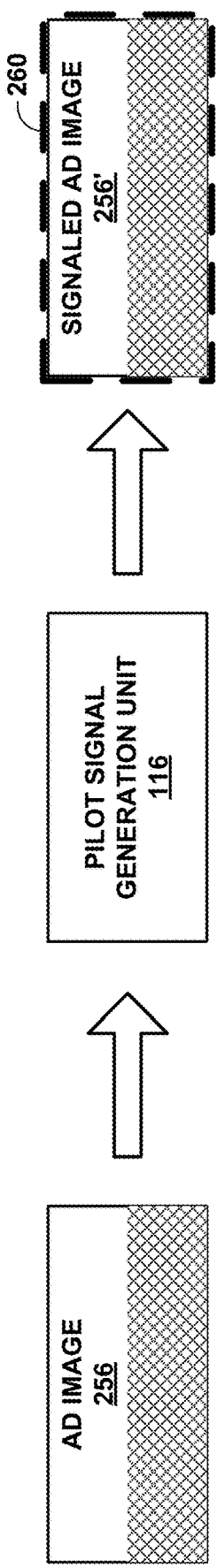
FIG. 3 is a conceptual diagram illustrating an example process by which a pilot signal generation unit of FIG. 1 generates and adds a pilot signal to an advertisement (ad) image.

FIG. 3 is a conceptual diagram illustrating an example process by which pilot signal generation unit 116 (FIG. 1) generates and adds pilot signal 160 to advertisement (ad) image 256. Initially, pilot signal generation unit 116 receives ad image 256, which may correspond to one of media assets 112 (FIG. 1). Watermark unit 114 of FIG. 1 may have already inserted a watermark into ad image 256, although the pilot signal generation techniques of this disclosure are not necessarily limited to use in combination with watermarks. For example, pilot signal generation unit 116 may insert pilot signals around just watermarks within an ad image, or around the entire ad image, e.g., as shown in the example of FIG. 3.

In this example, pilot signal generation unit 116 generates pilot signal 260 to be added around ad image 256. Techniques for generating pilot signal 260 are discussed in greater detail below. In general, pilot signal generation unit 116 may generate pilot signal 260 to be detectable by a computing device, such as client device 130 and/or GPU 136 (FIG. 1), but imperceptible to human users. Pilot signal generation unit 116 may then form signaled ad image 256' including pilot signal 260.

Color images may have three color planes, such as red, green, and blue (RGB), or luminance and two chrominance (blue hue and red hue, YCbCr, or YUV). Pilot signal generation unit 116 may use this characteristic to increase the robustness of pilot signal 260. For instance, if RGB color planes are used, pilot signal generation unit 116 may place different weighted versions of the same pilot signal in each color plane to form a cross plane pilot signal. For detection, ROI detection unit 164 may combine the different color planes with the weights used for the cross-color plane pilot signal construction. This is equivalent to projecting the multi-channel image onto the vector of cross color weights before using a single plane pilot detection process.

To construct a pilot signal for multiple color channels from a 2D pilot signal for an individual color plane, pilot signal generation unit 116 may use a color plane weight vector, such as, for example, color plane weight vector W(p)=[1, −2, 1] or W(p)=[1,0, −1]. Pilot signal generation unit 116 may add a pilot signal to a particular color plane p according to the previously described 2D pilot signal generation techniques, and weighted by the appropriate value of W. Both weight vectors will block grey scale images, with R=G=B. The second weight also blocks pure green signals.

It is tempting to think a pure blue signal would be blocked by the second vector, since the weighted product would be negative while the pilot signal would be positive. Despite being negative, a signal could have a negative offset when the pilot signal is added to original data, which is blue for instance. These weights may be accounted for in the detection process performed by RIO detection unit 164.

If the pilot signal is added to only a single row or column along the edge of an image, it may not be robust to downsampling or compression. To increase robustness, pilot signal generation unit 116 may use multiple rows or columns to carry pilot signal 260. This increases robustness but may increase visibility. Pilot signal generation unit 1116 may modulate lines of pilot signal 260 by an orthogonal kernel to reduce the visibility of the widened pilot signal. To retain robustness to down-sampling, the orthogonal kernel need not have maximum frequency. A candidate orthogonal kernel is [1, 1, −1, −1, 1, 1]. Pilot signal generation unit 116 may perform the pilot signal construction process separately for rows and columns, and add each pilot signal (collectively forming pilot signal 260) to the edges (top, bottom, left, and right) of ad image 256, to produce signaled ad image 256'. Additional details regarding example techniques for generating pilot signal 260 are discussed below with respect to FIGS. 7 and 8.

Figure 4:
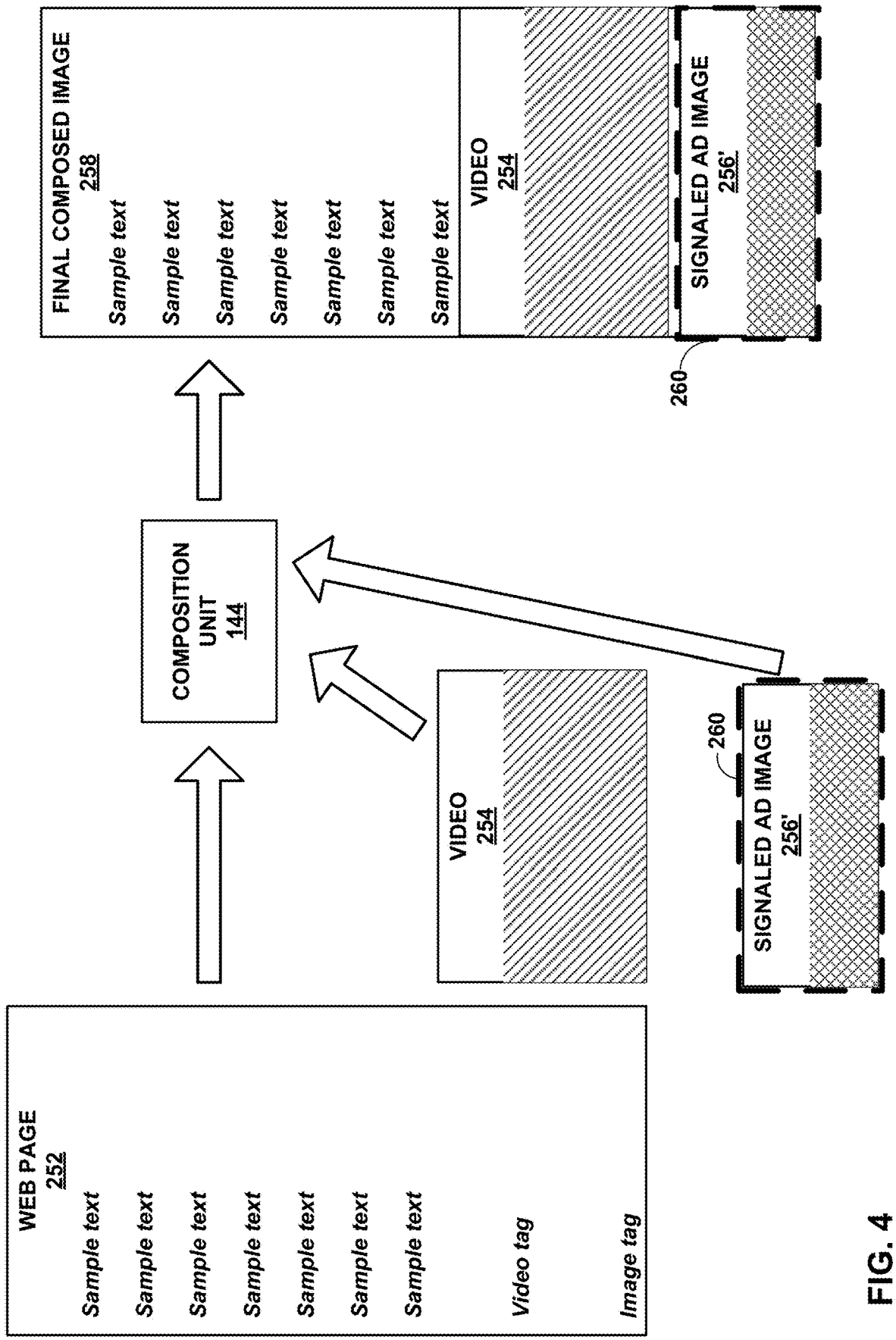
FIG. 4 is a conceptual diagram illustrating an example process by which the composition unit of FIG. 1 forms a final composed image from a web page, video data, and a signaled ad image.

FIG. 4 is a conceptual diagram illustrating an example process by which composition unit 144 of FIG. 1 forms final composed image 258 from web page 252, video data 254, and a signaled ad image 256'. Web page 252 includes text and data representing points at which to insert video data and advertisement image data. Video data 254 and signaled ad image 256' represent decoded image data for a video and an advertisement received from, e.g., image/video decoding unit 146 (FIG. 1). Composition unit 144 forms final composed image 258 including data from web page 252 (e.g., text data), one frame of video data 254 inserted at an appropriate point as indicated by web page 252, and signaled ad image 256' inserted at an appropriated point as indicated by web page 252.

According to the techniques of this disclosure, pilot signal generation unit 116 may introduce pilot signal 260 into a source image of original ad content, such as ad image 256. For example, pilot signal generation unit 116 may introduce pilot signal 260 by performing a discrete wavelet transform decomposition of ad image 256 and setting a constant value in the edges of one or more bands of the decomposition.

As an alternative to computing the wavelet transform and inserting pilot signal 260 into a particular band, pilot signal generation unit 116 may add a signal to the image in the pixel domain. These techniques may be equivalent, depending on the design of the signal added to the image. Construction of pilot signal 260 and inclusion within an image is discussed in greater detail below.

An alternative way to produce pilot signal 260 is to add sinusoids to the edges of ad image 256. Pilot signal 260 may satisfy any or all of the following properties: invisible additional distortion, robust against downscaling by a factor as large as D, and low complexity detection, assuming upscaling by at most a factor U.

In one example, pilot signal generation unit 116 may define a single sinusoid with frequency robust to downscaling by D. To design the frequency of the pilot signal, following downscaling of the image by the factor of D, the digital frequency of the pilot signal is multiplied by D. Considering that the highest digital frequency is ½, pilot signal 260 should have a component of frequency less than D/2 to survive the downscaling process. Additionally, pilot signal 260 may have a 2D footprint of at least D samples in the direction orthogonal to the main pilot signal length, i.e., D high and W width for an image of width W.

Figure 5:
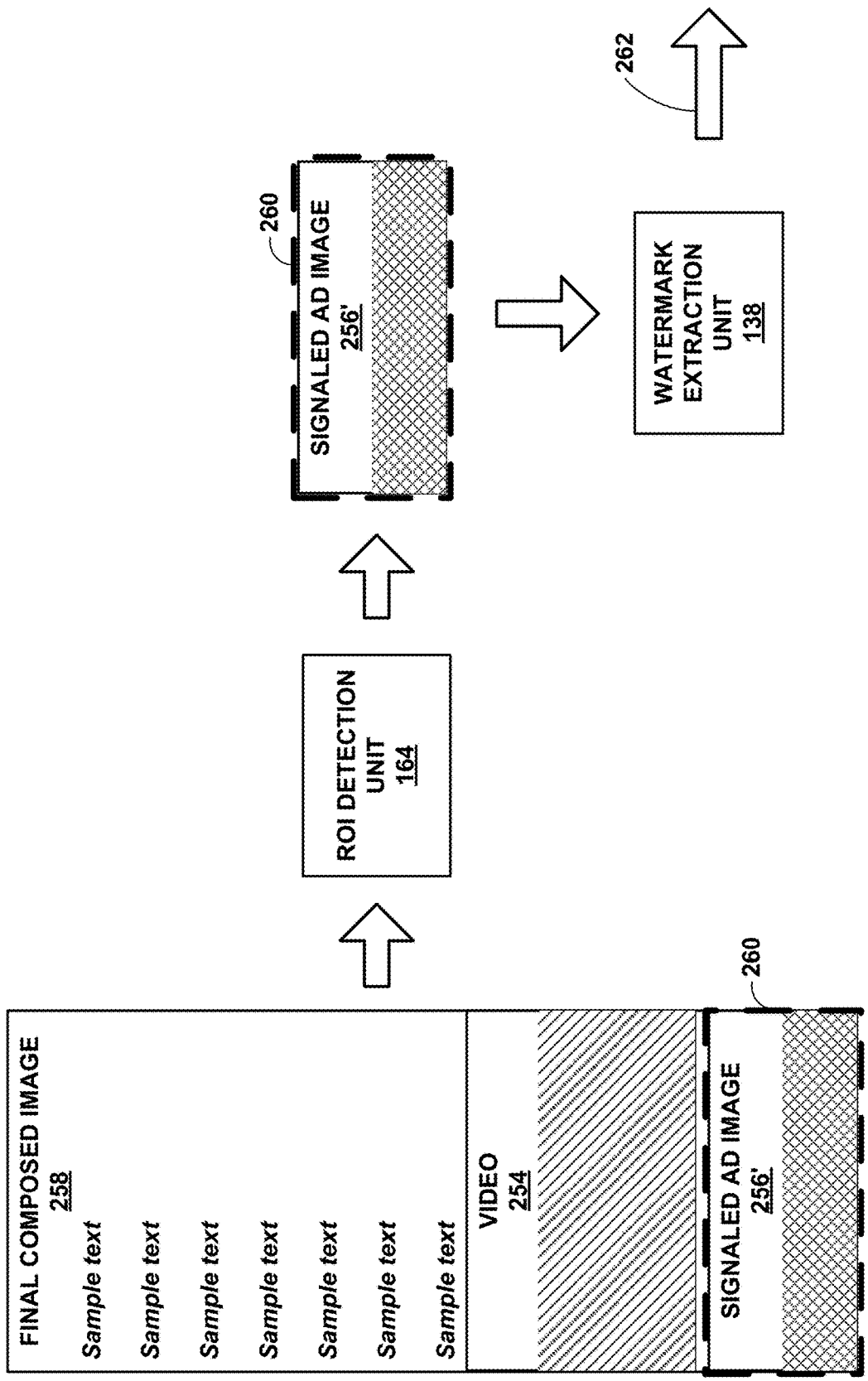
FIG. 5 is a conceptual diagram illustrating an example process by which GPU 136 (FIG. 1) can determine a region of interest (ROI) indicated by pilot signal 260 and extract a watermark from the ROI.

FIG. 5 is a conceptual diagram illustrating an example process by which GPU 136 (FIG. 1) can determine a region of interest (ROI) indicated by pilot signal 260 and extract a watermark from the ROI. As noted above, final composed image 258 includes web page data, video data 254, and signaled ad image 256'. Pilot signal 260 surrounds signaled ad image 256', to aid in detection of signaled ad image 256'. That is, signaled ad image 256' represents an ROI of final composed image 258.

As discussed above with respect to FIG. 2, ROI detection unit 164 may receive and process final composed image 258. For example, ROI detection unit 164 may retrieve final composed image 258 from a display buffer, such as buffer 148 (FIG. 1). Alternatively, ROI detection unit 164 may receive final composed image 258 from composition unit 144.

In either case, ROI detection unit 164 processes final composed image 258 to search for a pilot signal, as discussed in greater detail below. After detecting pilot signal 260, ROI detection unit 164 may extract signaled ad image 256' by extracting pixels surrounded by pilot signal 260, which in this case corresponds to signaled ad image 256'. ROI detection unit 164 may then send the extracted pixels (that is, the ROI, which corresponds to signaled ad image 256') to watermark extraction unit 138. Watermark extraction unit 138 may then search signaled ad image 256' for a watermark, which may include an identifier for signaled ad image 256'. As discussed above with respect to FIG. 2, watermark extraction unit 138 may then provide the identifier to tracking unit 166. In this example, watermark extraction unit 138 extracts identifier 262 and sends identifier 262 to, e.g., tracking unit 166 (FIG. 2).

For detection, ROI detection unit 164 may use a set of probes of periods [2,3, . . . 2·D], corresponding frequencies $$\left[\frac{1}{2}, \frac{1}{3}, \ldots, \frac{1}{2 \cdot D}\right],$$

and of phases 0 and ½. ROI detection unit 164 may use the following equation to define the probe signals:

$$f_{p,\varphi}(x) = \cos\left(2 \cdot \frac{\pi}{p} \cdot x + \varphi\right)$$

$$p \in [2, 3, \cdots 2 \cdot D], \varphi \in \left[0, \frac{1}{2}\right]$$

ROI detection unit 164 may detect pilot signal 260 by correlating each of the probe signals with the rows or columns of the image in the buffer of interest. ROI detection unit 164 may combine correlations of different phases in magnitude to produce p response functions, where each response function is a function of the image row or column. The following equation represents a row correlation function, although similar techniques may be performed by replacing "row" with "column":

$$R_p(\text{row}) = |\Sigma f_{p,0}(x) \cdot \text{img}(\text{row},x)|^2 + |\Sigma f_{p,1/2}(x) \cdot \text{img}(\text{row},x)|^2$$

ROI detection unit 164 may detect a pilot signal in a particular row (or column) by comparing the maximum response with a threshold. The threshold may be based on the image width, in the case of correlating row signals, or height for columns. The following equation is an example for rows, but "row" may be replaced with "column" for detecting pilot signals in columns:

$$\text{PilotPresent}(\text{row}) = \max_p(R_p(\text{row})) > \text{Threshold}$$

Additional details regarding example techniques for detecting pilot signals are discussed below with respect to FIGS. 9 and 10.

Given the example detection process discussed above, pilot signal 260 may include a component to provide robustness against upscaling by a factor U. When upscaled by a factor U, the frequency of the pilot is scaled by 1/U, and thus, equivalently the period is scaled by U. Considering the probe signals, pilot signal generation unit 116 may generate pilot signal 260 to include a component with frequency which can be detected by the at least one probe signal following upscaling by U. This may use a period in the set $p \in [2 \cdot U, 3 \cdot U, \ldots 2 \cdot D \cdot U]$.

Based on this analysis, pilot signal generation unit 116 may design pilot signal 260 to include two components, one with period 2D preserved under extreme downscaling and a second component of period 2U, which may respond to the probe signals under extreme upscaling, as follows:

$$f_{pilot}(x) = \cos(2 \cdot \pi \cdot f_{low} \cdot x) + \cos(2 \cdot \pi \cdot f_{high} \cdot x)$$

$$f_{low} = \left(\frac{1}{2 \cdot D}\right)$$

$$f_{high} = \left(\frac{1}{2 \cdot U}\right)$$

Pilot signal generation unit 116 may form pilot signal 260 to include additional components. These components may be used to ensure robustness under extreme downscaling by D and that the same probe signals may still work if upscaled by at most U.

Figure 6A:
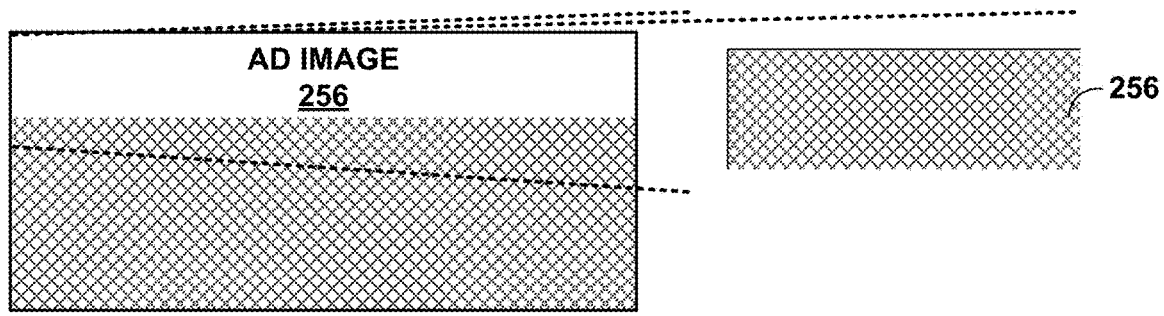
FIGS. 6A and 6B are conceptual diagrams illustrating an example pilot signal inserted into an example image.
Figure 6B:
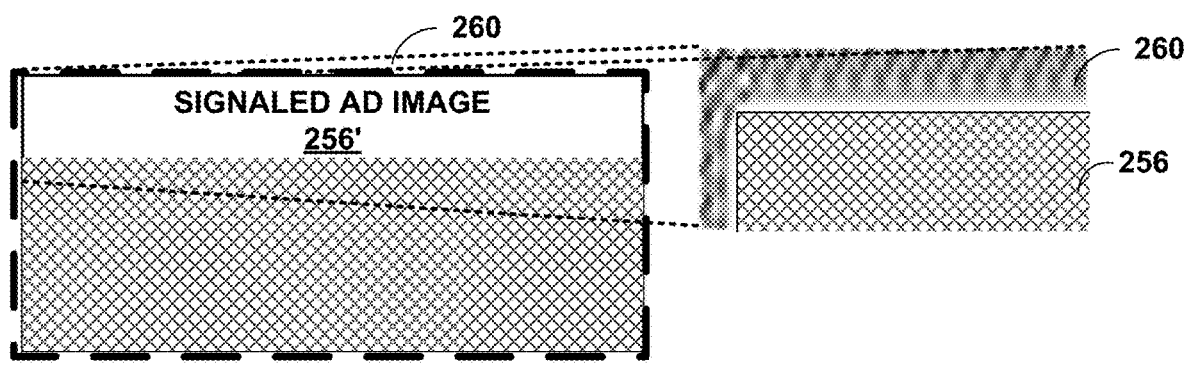

FIGS. 6A and 6B are conceptual diagrams illustrating an example pilot signal inserted into an example image. FIG. 6A depicts original ad image 256, both full size and zoomed in on an upper-left corner. As can be seen on the right side of FIG. 6A (i.e., the zoomed in portion), there is no pilot signal around ad image 256.

FIG. 6B depicts signaled ad image 256', which includes pilot signal 260. Like FIG. 6A, FIG. 6B also depicts both a full size version and a zoomed in version of signaled ad image 256'. The right side of FIG. 6B depicts a graphical example of pilot signal 260. As can be seen in FIG. 6B, pilot signal 260 may include alternating brighter and darker pixels (or groups of pixels). Colors and/or brightness (luminance) of the pixels forming pilot signal 260 may be based on the content of ad image 256, thereby rendering pilot signal 260 imperceptible to human viewers, but detectable by a computing device.

Figure 7:
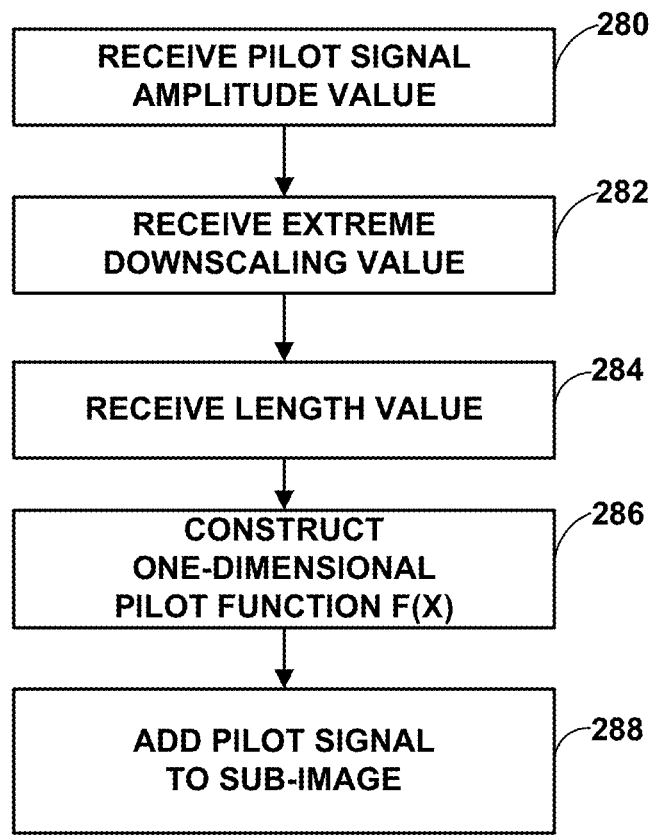
FIG. 7 is a flowchart illustrating an example process by which a pilot function can be generated according to the techniques of this disclosure.

FIG. 7 is a flowchart illustrating an example process by which a pilot function can be generated according to the techniques of this disclosure. The method of FIG. 7 is explained with respect to pilot signal generation unit 116 for purposes of example, but this or a similar method may be performed by other devices or units as well. Pilot signal generation unit 116 may receive as input a maximum downscaling factor (DS), a color weight vector (W), an orthogonal spatial kernel (K), and height and width of signaled ad image 256' including pilot signal 260. The method of FIG. 7 is explained with respect to a single border (e.g., top, bottom, left, or right) of an input ad image to which to add a pilot signal. Pilot signal generation unit 116 may perform the method of FIG. 7 for each border of the ad image (or other sub-image) to which to add pilot signals. In some examples, pilot signal generation unit 116 may add pilot signals to only one row and/or column. In some examples, the pilot signals do not span the full length or height of the sub-image (ROI), while in other examples, the pilot signals may fully surround the sub-image.

Pilot signal generation unit 116 may receive a pilot signal amplitude value (280). In general, for a given direction (row or column), pilot signal generation unit 116 may design a one-dimensional (1D) signal based on a relevant dimension (width or height) of the sub-image. Pilot signal generation unit 116 may design the 1D signal so that the 1D signal has zero low frequency content but energy that will be preserved under down-sampling by the extreme down-sampling (that is, downscaling) factor, DS. Thus, pilot signal generation unit 116 also receives the extreme downscaling (or down-sampling) value DS (282). Pilot signal generation unit 116 further receives a length value (284), representing a length of the sub-image for which a row of the pilot signal is to be generated. For a column of the pilot signal, the length value may be replaced with a height value. Pilot signal generation unit 116 may use the length, amplitude, and DS values to construct the one-dimensional (1D) pilot function f(x) (286) and add the pilot signals to the sub-image (288).

If a single sinusoid is used, the digital frequency may be ½*1/D, so that when the pilot signal is down-sampled by factor DS, and the digital frequency is thus multiplied by D, the resulting signal has a maximum digital frequency of ½. Pilot signal generation unit 116 may use the example equation (1) below to construct a narrow band signal that defines a single sinusoid robust to downscaling by factor D in step (286):

$$f_{narrow\ band}(x) = \text{Amplitude}_{pilot} \cdot \cos(2 \cdot pi \cdot F_{pilot} \cdot x), \quad (1)$$

$$F_{pilot} = \frac{1}{2 \cdot D},$$

$$x \in [1, \text{Length}]$$

An alternate definition of the 1D pilot signal may be made for a dual sinusoid example. In the dual sinusoid example, in addition to the narrow band pilot signal, pilot signal generation unit 116 may add an additional sinusoid at a higher frequency, determined by an extreme upsampling (or upscaling) factor U. The additional frequency may be ½*1/U.

Pilot signal generation unit 116 may generate wide band pilot signals to have energy confined to a frequency range greater than the extreme down sampling frequency used in the single sinusoid narrow band example. In some examples, pilot signal generation unit 116 may use a Haar wavelet function to define the 1D pilot signal, e.g., for [1,1, −1,−1, 1,1, . . . ]. Pilot signal generation unit 116 may use a Zadoff-Chu sequence when generating the pilot signal.

In this manner, the method of FIG. 7 represents an example of a method of processing image data including processing an image to identify a pilot signal in the image indicating a region of interest (ROI) of the image, the pilot signal forming a boundary around the ROI and having pixel values defined according to a mathematical relationship with pixel values within the ROI such that the pilot signal is not perceptible to a human user and is detectable by a computing device; determining the ROI of the image using the pilot signal; and further processing the ROI to attempt to detect one or more contents of the ROI without attempting to detect the one or more contents of the image in portions of the image outside the ROI.

Figure 8:
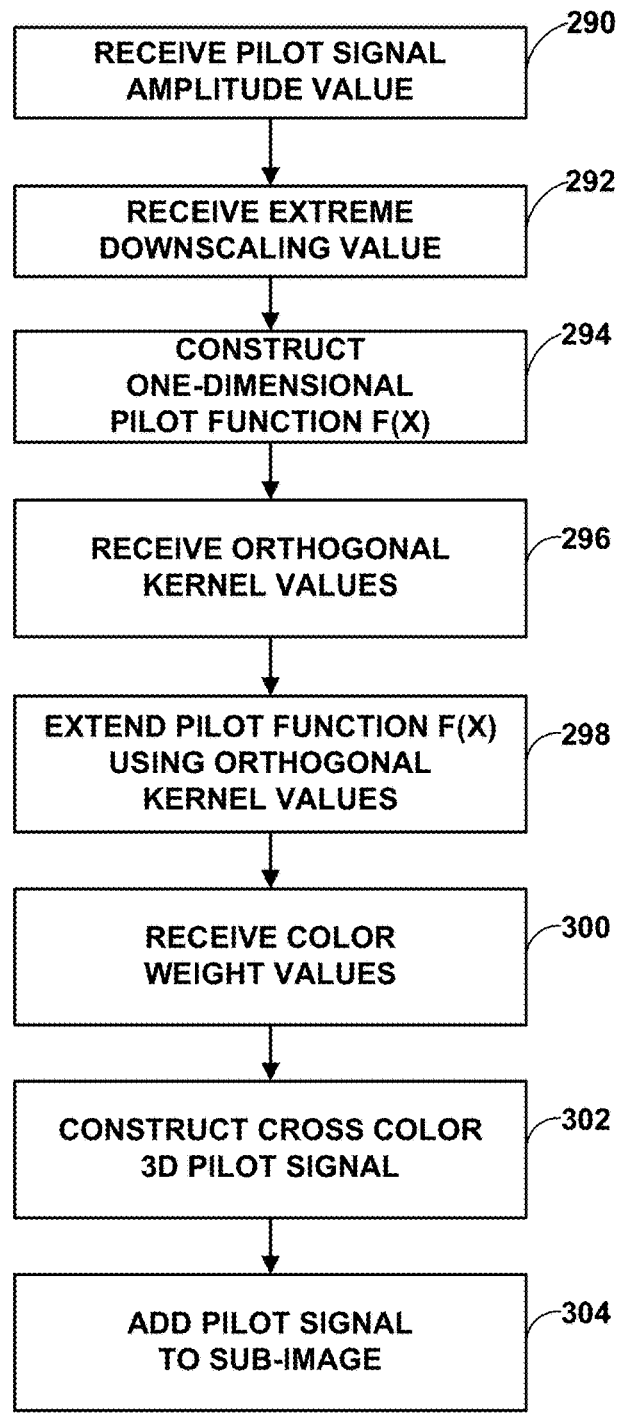
FIG. 8 is a flowchart illustrating another example process by which a pilot function can be generated and enhanced using orthogonal kernel values and color weight values according to the techniques of this disclosure.

FIG. 8 is a flowchart illustrating another example process by which a pilot function can be generated and enhanced using orthogonal kernel values and color weight values according to the techniques of this disclosure. The method of FIG. 8 is also explained with respect to pilot signal generation unit 116 for purposes of example and explanation, although other devices and units may be configured to perform this or a similar method.

A 1D pilot signal may not be robust to compression, scaling, or other processing that can happen in the image processing chain. Therefore, in some examples, pilot signal generation unit 116 may generate a wider 1D signal. Rather than merely duplicate the same 1D signal in adjacent lines/columns, pilot signal generation unit may increase the 1D signal to a two-dimensional (2D) signal using an orthogonal dimension kernel of length K. Finally, pilot signal generation unit 116 may extend the 2D kernels to 3D by accounting for a color plane weight function W.

As in the method of FIG. 7, pilot signal generation unit 116 may receive a pilot signal amplitude value (290), receive an extreme downscaling value (DS) (292), and construct a one-dimensional pilot function f(x) (294). Pilot signal generation unit 116 may then receive one or more orthogonal kernel values (296), e.g., [1, 1, −1, −1]. Pilot signal generation unit 116 may then extend the pilot function f(x) using the orthogonal kernel values (298). For example, pilot signal generation unit 116 may derive a 2D pilot signal from extending the 1D pilot function f(x) using an orthogonal kernel function K( ) according to the following equation (2) for rows in the pilot signal (and replace "row" with "column" for columns in the pilot signal):

$$P_{2D}^{row}(y,x) = P_{1D}^{row}(x) \cdot K(y) \quad y \in [1,\kappa] \; x \in [1,L] \quad (2)$$

Pilot signal generation unit 116 may also receive color weight values (300) and construct a cross color three-dimensional (3D) pilot signal (302) using the color weight values. The color weight values may be, for example, W=[1, −2, 1]. Pilot signal generation unit 116 may derive a 3D pilot signal using a single color plane 2D pilot signal and color weight values W( ) according to the following equation (3):

$$P_{3D}^{row}(y,x,c) = P_{2D}^{row}(y,x) \cdot W(c) \quad y \in [1,K] \; x \in [1,L] \; c \in [1,3] \quad (3)$$

A similar process may be used to construct pilot signals for left and right columns of the image, as noted above.

Pilot signal generation unit 116 may also add the pilot signal to the sub-image (304). For example, pilot signal generation unit 116 may add the row and column pilot signals to edges of the sub-image (top, bottom, left, and right). In particular, pilot signal generation unit 116 may execute the following example functions (4, 5, 6, 7) for each of the edges of the sub-image:

Top Row:

$$\widehat{image}(y,x,c) = image(y,x,c) + P_{3D}^{row}(y,x,c) \quad y \in [1,K] \; x \in [1,W] \; c \in [1,3] \quad (4)$$

Bottom Row:

$$\widehat{image}(y,x,c) = image(y,x,c) + P_{3D}^{row}(y-(H-K),x,c) \quad y \in [(H-K)+1,H] \; x \in [1,W] \; c \in [1,3] \quad (5)$$

Left Column:

$$\widehat{image}(y,x,c) = image(y,x,c) + P_{3D}^{col}(y,x,c) \quad y \in [1,H] \; x \in [1,K] \; c \in [1,3] \quad (6)$$

Right Column:

$$\widehat{image}(y,x,c) = image(y,x,c) + P_{3D}^{col}(y,x-(W-K),c) \quad y \in [1,H] \; x \in [(W-K)+1,W] \; c \in [1,3] \quad (7)$$

In this manner, the method of FIG. 8 also represents an example of a method of processing image data including processing an image to identify a pilot signal in the image indicating a region of interest (ROI) of the image, the pilot signal forming a boundary around the ROI and having pixel values defined according to a mathematical relationship with pixel values within the ROI such that the pilot signal is not perceptible to a human user and is detectable by a computing device; determining the ROI of the image using the pilot signal; and further processing the ROI to attempt to detect one or more contents of the ROI without attempting to detect the one or more contents of the image in portions of the image outside the ROI.

Figure 9:
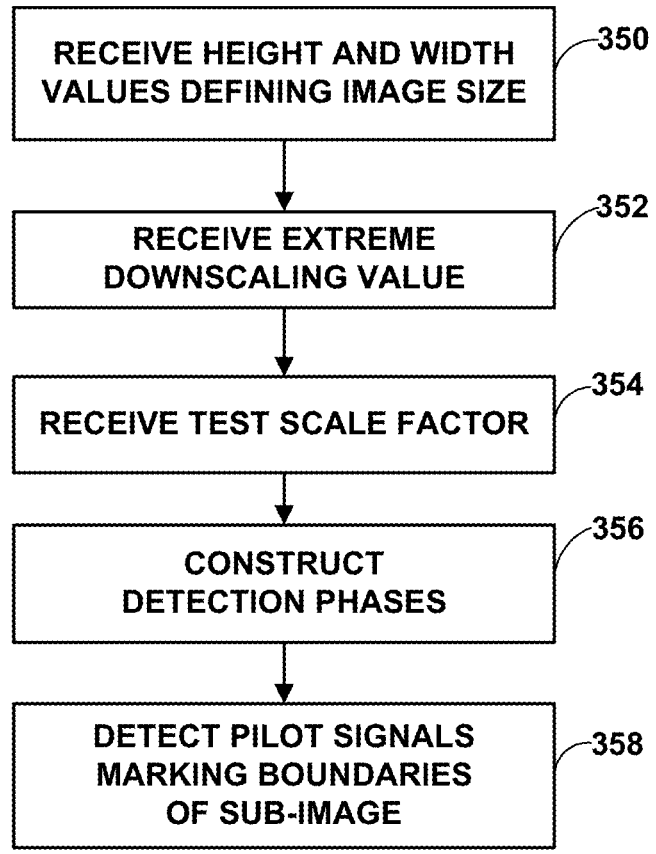
FIG. 9 is a flowchart illustrating an example method of detecting pilot signals defining a region of interest (ROI) in an image according to the techniques of this disclosure.

FIG. 9 is a flowchart illustrating an example method of detecting pilot signals defining a region of interest (ROI) in an image according to the techniques of this disclosure. The method of FIG. 9 is explained with respect to ROI detection unit 164 (FIG. 2) of GPU 136 (FIGS. 1 and 2). In other examples, GPU 136 need not include a discrete ROI detection unit, or the functionality attributed to ROI detection unit 164 may be functionally integrated with other units of GPU 136 or performed by GPU 136 directly, e.g., in the form of executable instructions.

In general, ROI detection unit 164 may perform a detection process in which ROI detection unit 164 receives, as input, a candidate full color image. ROI detection unit 164 may be configured with pilot signal design parameters, specifically the maximum downscaling factor. Alternatively, ROI detection unit 164 may receive data defining the maximum downscaling factor as input. In general, the description of FIGS. 9 and 10 focuses on detection of a pilot signal in a single frame. To address the potential for unknown scaling factor being applied during rendering, a set of candidate test scale factors can be produced and cycled through the set over multiple frames. In this situation, ROI detection unit 164 may search each frame for a pilot signal with an assumed scaling factor. A high-level loop over a set of test scaling factors can be used.

Initially, ROI detection unit 164 may receive height and width values defining an image size (350). ROI detection unit 164 may also receive an extreme downscaling value (DS) (352). ROI detection unit 164 may also receive a test scale factor (354). ROI detection unit 164 may then construct one or more detection phases (356). Ultimately, ROI detection unit 164 may detect pilot signals marking the boundaries (top, bottom, left, and right) of the sub image (358).

The following pseudocode defines an example algorithm for detecting pilot signals indicating boundaries of one or more sub-images (ROIs):

```
Begin with List of Test Scale Factors L and empty ROI list R
Loop i over number of test scale factors in list L
    Select TestScaleFactor = L(i)
    Select frame (either new frame or keep same frame)
    Rtemp = DetectROI(Frame, TestScaleFactor)
    Append Detected ROI to ROI list, R = R + Rtemp
Repeat loop
```

In the detection process, ROI detection unit 164 initially produces four 1D functions, two phases for each row and each column detection. ROI detection unit 164 uses an assumed scaling factor together with configuration that the pilot signal was designed for a maximum downscaling factor. In the case of narrow band signals, ROI detection unit 164 may use the downscaling factor to compute the frequency used in the pilot construction. ROI detection unit 164 may scale this frequency by the assumed scaling factor to produce the frequency used by the test kernel.

In other words, ROI detection unit 164 may perform two different detection phases, which may have respective threshold values. In the first detection phase, ROI detection unit 164 may process rows and columns of the image to identify a first pair of parallel boundaries in either the rows or the columns of the image having frequency response values exceeding a first threshold. In the second detection phase, ROI detection unit 164 may process either the rows or the columns of a portion of the image between the first pair of parallel boundaries and that are orthogonal to the first pair of parallel boundaries to identify a second pair of parallel boundaries, orthogonal to the first pair of boundaries, having frequency response values exceeding a second threshold. For example, if the first pair of parallel boundaries are rows, ROI detection unit 164 may process only columns of the image to identify columns of the pilot signal. Alternatively, if the first pair of parallel boundaries are columns, ROI detection unit 164 may process only rows of the image to identify rows of the pilot signal. ROI detection unit 164 may then determine that the pilot signal includes the first pair of parallel boundaries and the second pair of parallel boundaries. The pilot signal may include multiple rows and/or columns.

For a single sinusoid pilot signal, ROI detection unit 164 may use the following equations (8) to detect the pilot signal along each of the boundaries of the ROI/sub-image:

$$F_{kernel} = \frac{1}{2 \cdot D \cdot T} \tag{8}$$

$x \in [1, \text{Width}]$ $y \in [1, \text{Height}]$ $f_0^{row}(x) = \cos(2 \cdot \text{pi} \cdot F_{kernel} \cdot x)$ $f_1^{row}(x) = \sin(2 \cdot \text{pi} \cdot F_{kernel} \cdot x)$ $f_0^{col}(y) = \cos(2 \cdot \text{pi} \cdot F_{kernel} \cdot y)$ $f_0^{col}(y) = \sin(2 \cdot \text{pi} \cdot F_{kernel} \cdot y)$ For example, ROI detection unit 164 may include four detection kernels for detecting respective sides of the sub-image/ROI (top (row 0), bottom (row 1), left (column 0), and right (column 1)).

In this manner, the method of FIG. 9 represents an example of a method of processing image data including determining pixel values of an image at a boundary around the image; and processing the image to add a pilot signal at the boundary around the image, the pilot signal having pixel values defined according to a mathematical relationship with the pixel values of the sub-image such that the pilot signal is not perceptible to a human user and is detectable by a computing device.

Figure 10:
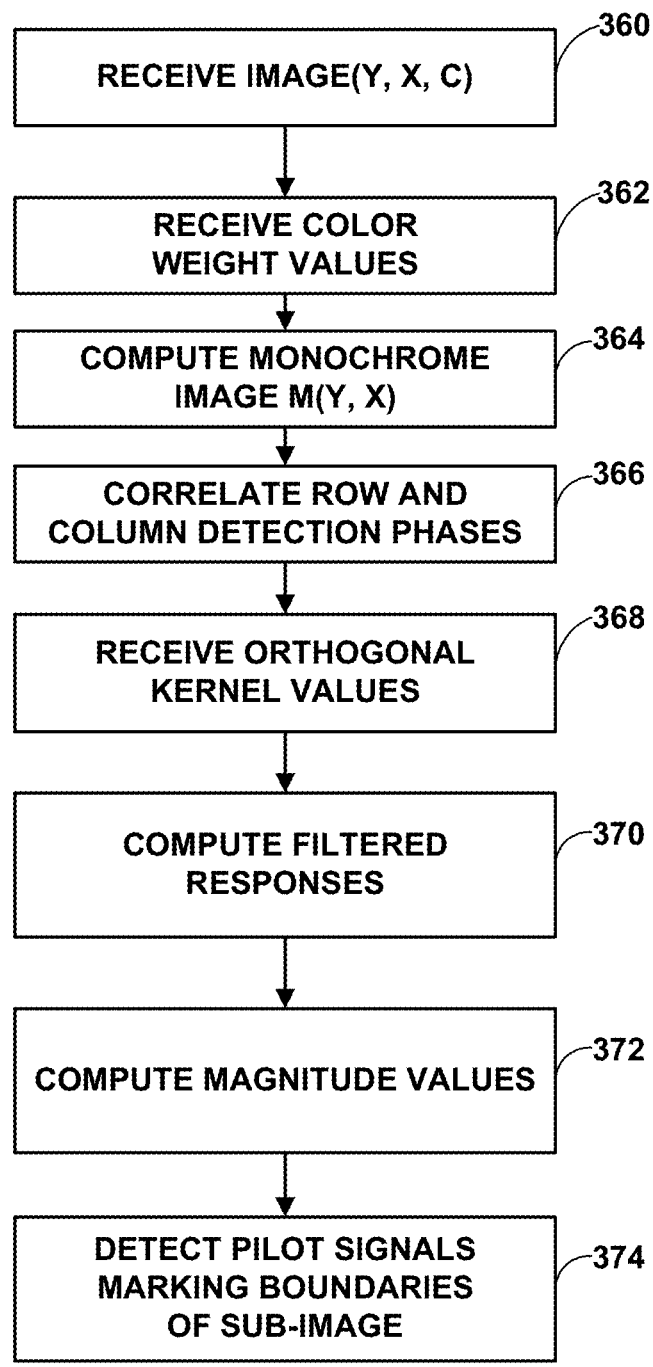
FIG. 10 is a flowchart illustrating another example method of detecting pilot signals defining a region of interest (ROI) in an image, where the pilot signals are enhanced by orthogonal kernel values and color weight values, according to the techniques of this disclosure.

FIG. 10 is a flowchart illustrating another example method of detecting pilot signals defining a region of interest (ROI) in an image, where the pilot signals are enhanced by orthogonal kernel values and color weight values, according to the techniques of this disclosure. The method of FIG. 10 is again explained with respect to ROI detection unit 164, for purposes of example and explanation, although other devices or units may be configured to perform this or a similar method, such as GPU 136 (FIGS. 1 and 2).

In this example, ROI detection unit 164 may include four detection kernels to perform the detection process, including two phases for the rows and columns, to detect the presence of the pilot signals in a sub-region of an image. Inputs include a color image, a color weight vector (W[ ], e.g., of length 3), four detection kernels as previously described, and an orthogonal spatial kernel (K). The color weight vector and orthogonal spatial kernel may be the same as used in the pilot signal construction process.

In the example of FIG. 10, ROI detection unit 164 may receive an image (Y, X, C) (360). ROI detection unit 164 may receive color weight values (362), e.g., W=[1, −2, 1]. ROI detection unit 164 may then compute a monochrome image M(y, x) (364). ROI detection unit 164 may compute the monochrome image by taking an inner product between each color factor and the color weight vector W. This is expressed in equation (9) below, in which the number of samples is divided by three, i.e. three color goes to monochrome:

$$M(y,x) = \Sigma_{c=0}^{3} W(c) \cdot \text{image}(y,x,c) \; y \in [1,H] \; x \in [1, W] \tag{9}$$

ROI detection unit 164 may then correlate row and column detection phases (366). ROI detection unit 164 may correlate rows and columns of the monochrome image against the respective row and column kernels for each phase to produce four response functions, two functions of rows and two functions of columns. Example equations (10, 11) below represent calculations of the row and column response functions for each phase. ROI detection unit 164 may scale each row response sample by the width of the image under test. ROI detection unit 164 may scale each column response by the height of the image under test.

Example Row Equation $$R_p(y) = \frac{1}{W} \cdot \sum_{x=1}^{W} f_p^{row}(x) \cdot M(y, x) \qquad (10)$$

$$p \in [0, 1]$$

$$y \in [1, H]$$

Example Column Equation $$C_p(x) = \frac{1}{H} \cdot \sum_{x=1}^{H} f_p^{row}(y) \cdot M(y, x) \qquad (11)$$

$$p \in [0, 1]$$

$$x \in [1, W]$$

In functions (10, 11), W represents a width of the image, H represents a height of the image, and M(y,x) represents the image.

ROI detection unit 164 may also receive orthogonal kernel values (368), e.g., [1, 1, −1, −1]. ROI detection unit 164 may use the orthogonal kernel values to compute filtered responses (370). That is, ROI detection unit 164 may filter the response functions using the orthogonal spatial kernel to give modified row and column response functions, according to the following equations (12, 13):

Example Row Equation $$\widetilde{R}_p(y) = \sum_{k=1}^{length(K)} K(1 + mod(y, length(K)) \cdot R_p(y) \; p \in [0,1] \; y \in [1, H] \qquad (12)$$

Example Column Equation $$\widetilde{C}_p(x) = \sum_{k=1}^{length(K)} K(1 + mod(x, length(K)) \cdot C_p(x) \; p \in [0,1] \; x \in [1, W] \qquad (13)$$

In functions (12, 13), length(K) represents a number of values in the orthogonal kernel values K, and wherein mod (a, b) represents a modulo function that returns a remainder resulting from dividing a by b.

ROI detection unit 164 may ultimately use the filtered responses to compute magnitude (that is, amplitude) values (372) of rows and columns of the image. That is, ROI detection unit 164 may eliminate the phases by computing row and column amplitude responses, e.g., according to the following equations (14, 15):

Example Row Amplitude Equation $$A_{row}(y) = \sum_{p=0}^{1} |\widetilde{R}_p(y)|^2 \; y \in [1, H] \qquad (14)$$

Example Column Amplitude Equation $$A_{column}(x) = \sum_{p=0}^{1} |\widetilde{C}_p(x)|^2 \; x \in [1, W] \qquad (15)$$

Ultimately, ROI detection unit 164 may detect pilot signals marking boundaries of a sub-image (374) using the amplitude responses. For example, ROI detection unit 164 may compare the amplitude response functions with a threshold value (T) to determine the rows and columns where the probe kernels indicated presence of a pilot signal. This comparison may yield two sets, one set of rows giving response and a second set of columns giving response, e.g., according to the following equations:

Row Equation $$S_{row} = \{r | A_{row}(r) > T\} \qquad (16)$$

Column Equation $$S_{column} = \{c | A_{column}(c) > T\} \qquad (17)$$

ROI detection unit 164 may include edges of the image in these sets, even if the response does not indicate their presence. ROI detection unit 164 may specify an ROI of the input image using two coordinate pairs: coordinates of the top-left point of the ROI and the coordinates of the bottom-right point of the ROI. From the sets of rows and columns indicated above, ROI detection unit 164 may produce a set of ROIs:

$$S_{ROI} = \{[(R_i, C_j), (R_{i+1}, C_{j+1}) | i \in [1, |S_{row}| - 1], j \in [1, |S_{column}| - 1]]\} \qquad (18)$$

Figure 11A:
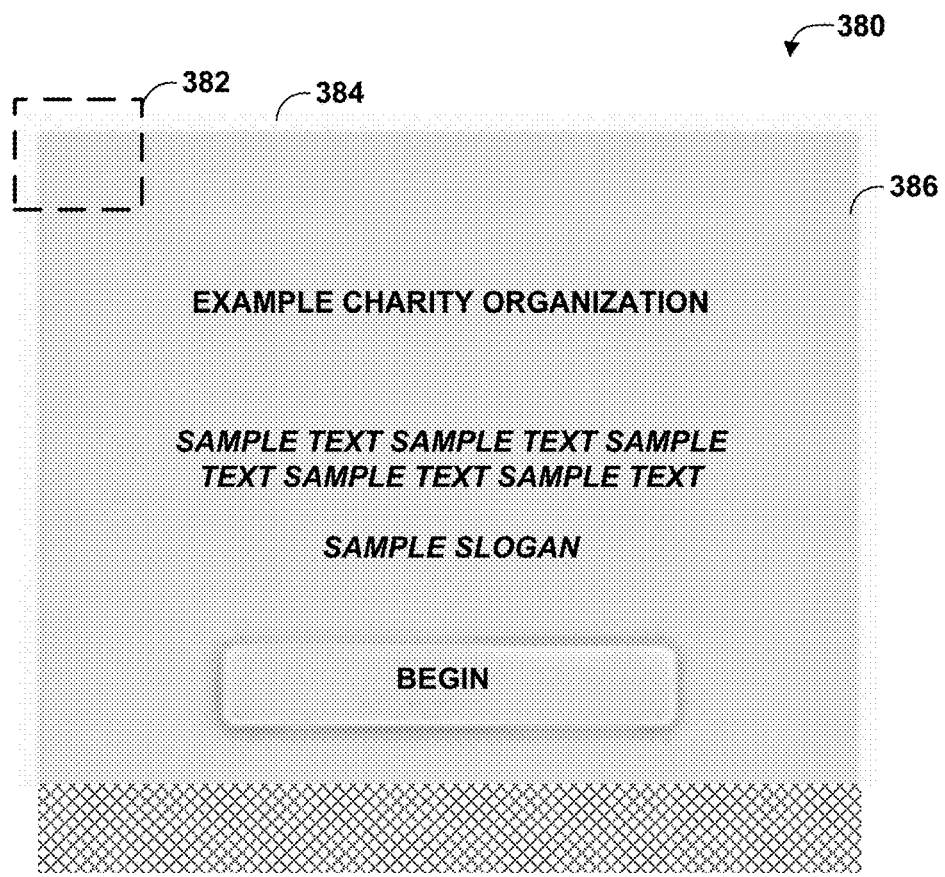
FIGS. 11A and 11B are conceptual diagrams illustrating an example pilot signaled advertisement image 380 including an example pilot signal 284 inserted around a border of pilot signaled advertisement image 380 according to the techniques of this disclosure.
Figure 11B:
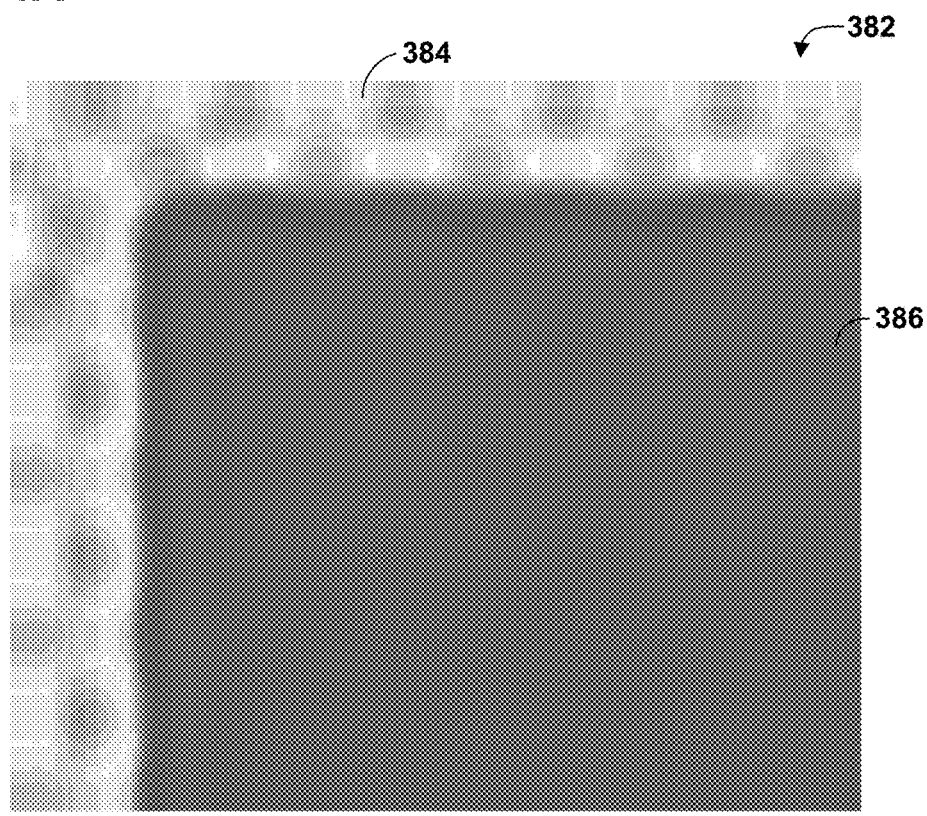

FIGS. 11A and 11B are conceptual diagrams illustrating an example pilot signaled advertisement image 380 including an example pilot signal 384 inserted around a border of pilot signaled advertisement image 380 according to the techniques of this disclosure.

Many images are tall and thin or short and wide. This disclosure recognizes that for images that have one dimension that is significantly longer than the other, one dimension may be simpler to detect. To make use of this, a sequential process may be used. In these cases, one dimension of the ROI is easier to detect than the other, e.g., it is easier to detect the rows than the columns of a short wide image. ROI detection unit 164 may use a two-level detection process to support these extreme image ranges. ROI detection unit 164 may scale each row response sample by the width of the image under test and each column response by the height of the image under test. ROI detection unit 164 may be configured with two thresholds: a primary detection threshold (T1) and a secondary detection threshold (T2).

The primary detection threshold may be for detecting pilot signals along the longer dimension, while the secondary detection threshold may be used for detecting pilot signals along the shorter dimension. ROI detection unit 164 may select the primary detection threshold based on a fraction of the image needed for a sub-image to be considered present.

For sub-images that are wide and short, ROI detection unit 164 may process the full original frame using, e.g., one of the detection processes discussed above or a similar process, to produce row and amplitude response functions as discussed above. ROI detection unit 164 may compare the row and amplitude response functions to the primary detection threshold as shown above (but "T" may be replaced with "T1").

ROI detection unit 164 may then process only a portion of the full image that is within the rows in which the pilot signals were detected. That is, ROI detection unit 164 may use the pilot signals detected in the primary detection process to define a band of the full image in which to search for pilot signals in an orthogonal direction. If pilot signal columns were detected during the primary detection phase, ROI detection unit 164 may instead detect rows in a band of the image defined by the positions of the columns. ROI detection unit 164 may process the resulting portion of the image within the boundaries defined by the pilot signals detected during the primary detection process as discussed above, using the secondary detection threshold as shown above (but replacing "T" with "T2").

In this manner, the method of FIG. 10 represents an example of a method of processing image data including determining pixel values of an image at a boundary around the image; and processing the image to add a pilot signal at the boundary around the image, the pilot signal having pixel values defined according to a mathematical relationship with the pixel values of the sub-image such that the pilot signal is not perceptible to a human user and is detectable by a computing device.

FIG. 11A illustrates an example of a signaled ad image 380, including ad image 386 and pilot signal 384. Sub-portion 382 of signaled ad image 380 is shown zoomed in in FIG. 11B. As can be seen in FIG. 11B, pilot signal 384 includes alternating light and dark areas that would be imperceptible to a user (e.g., as shown in FIG. 11A), but detectable by a computing device. In practice, pilot signal 384 may include slight deviations of color and/or luminance (brightness), but only greyscale is shown in FIG. 11B.

Figure 12:
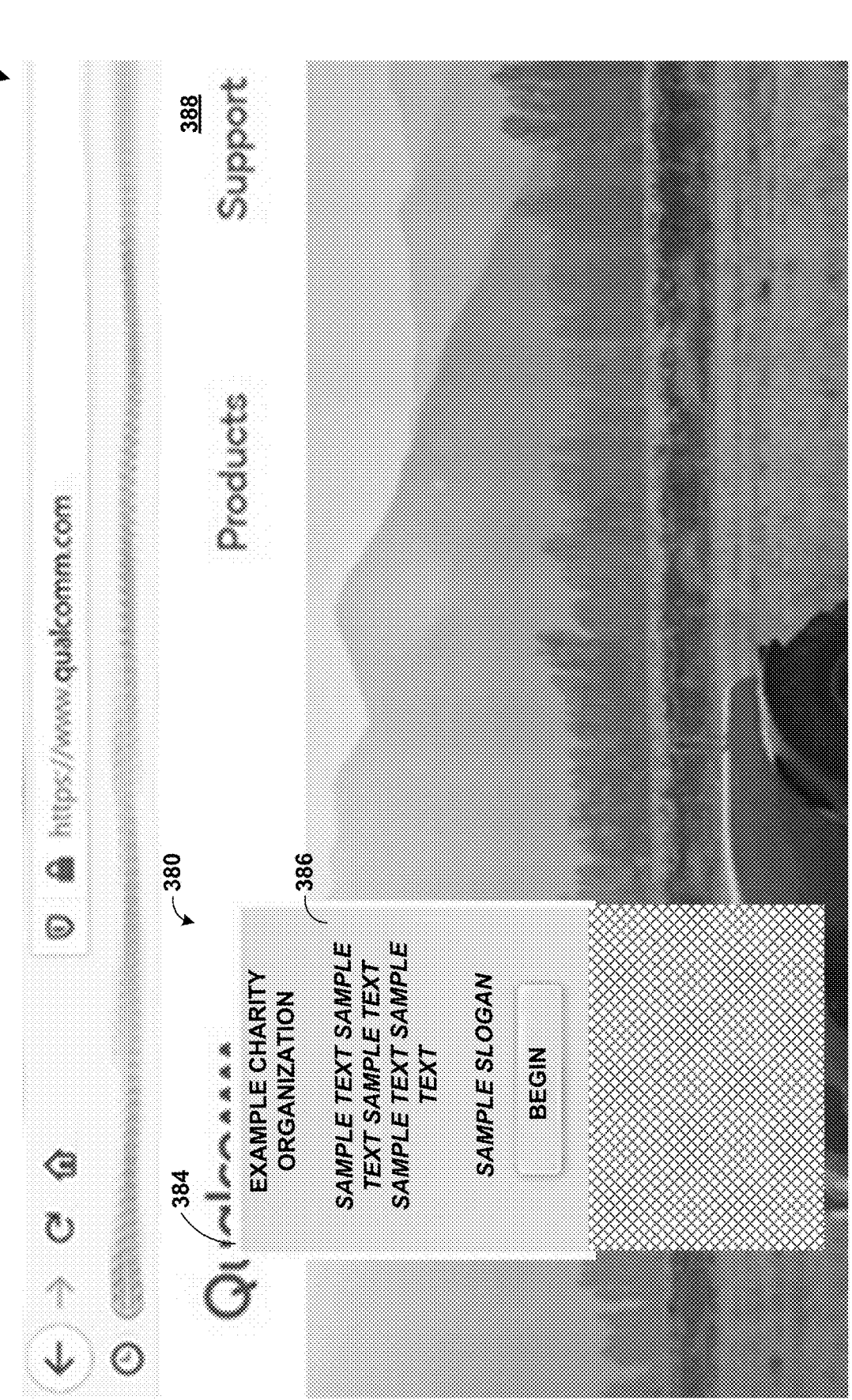
FIG. 12 is a conceptual diagram illustrating an example web page 388 including a pilot signaled advertisement image 380 according to the techniques of this disclosure.

FIG. 12 is a conceptual diagram illustrating an example web page 388 including signaled ad image 380 according to the techniques of this disclosure. That is, web page 388 includes signaled ad image 380 of FIGS. 11A and 11B. Web page 388 represents an example of a web page to which ROI detection unit 164 may apply the techniques of this disclosure to detect signaled ad image 380.

According to the techniques of this disclosure, ROI detection unit 164 may first convert web page 388 to a monochrome image using the same color weights used to insert pilot signal 384. ROI detection unit 164 may then perform two instances of the primary detection process on rows and columns, respectively, of web page 388.

Figure 13A:
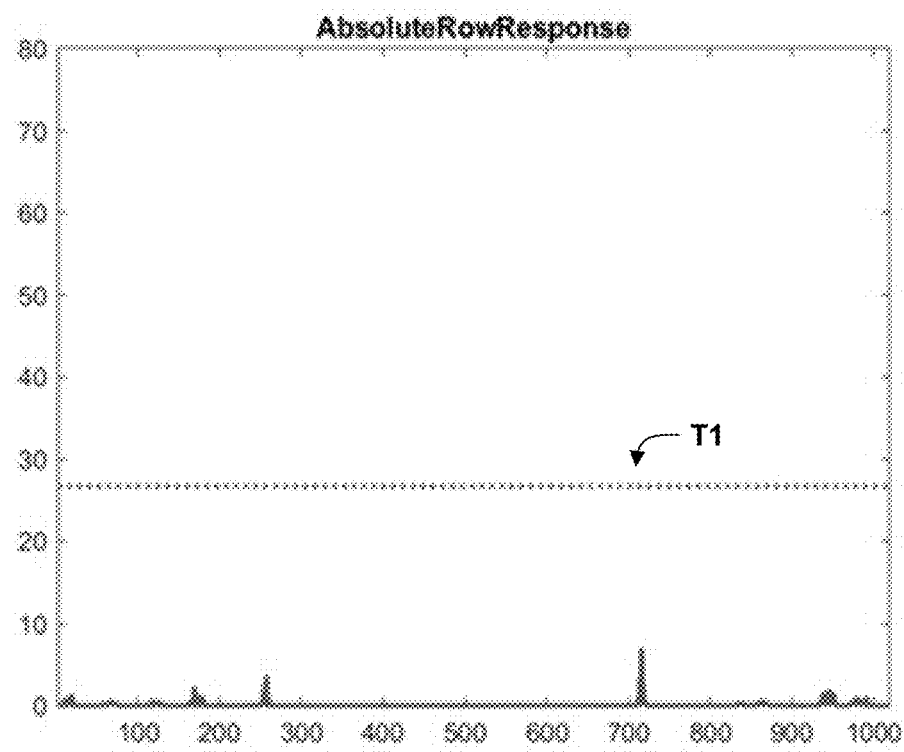
FIGS. 13A and 13B are graphs representing examples of row and column response functions for detecting locations of pilot signals in the example of web page 388 of FIG. 12 according to the techniques of this disclosure.
Figure 13B:
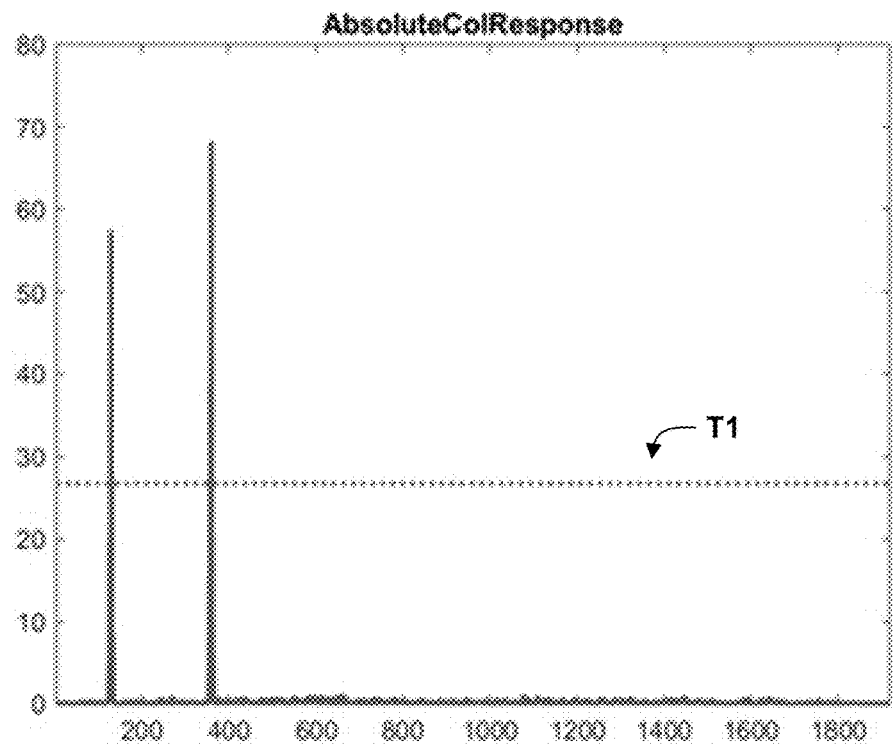

FIGS. 13A and 13B are graphs representing examples of row and column response functions for detecting locations of pilot signals in the example of web page 388 of FIG. 12 according to the techniques of this disclosure. In particular, FIG. 13A illustrates the row responses and FIG. 13B illustrates the column responses.

In the example of FIGS. 11A, 11B, and 12, signaled ad image 380 is taller than wide, and therefore, the absolute column responses shown in FIG. 13B are stronger and show two regions of web page 388 that exceed threshold T1. By contrast, while there are several peaks in the graph of FIG. 13A, none of the responses is strong enough to exceed threshold T1. Therefore, ROI detection unit 164 may determine that there is a sub image that is taller than it is wide.

In this example, FIG. 13B illustrates two values that cross threshold T1, which may correspond to edges of a pilot signal.

Figure 14:
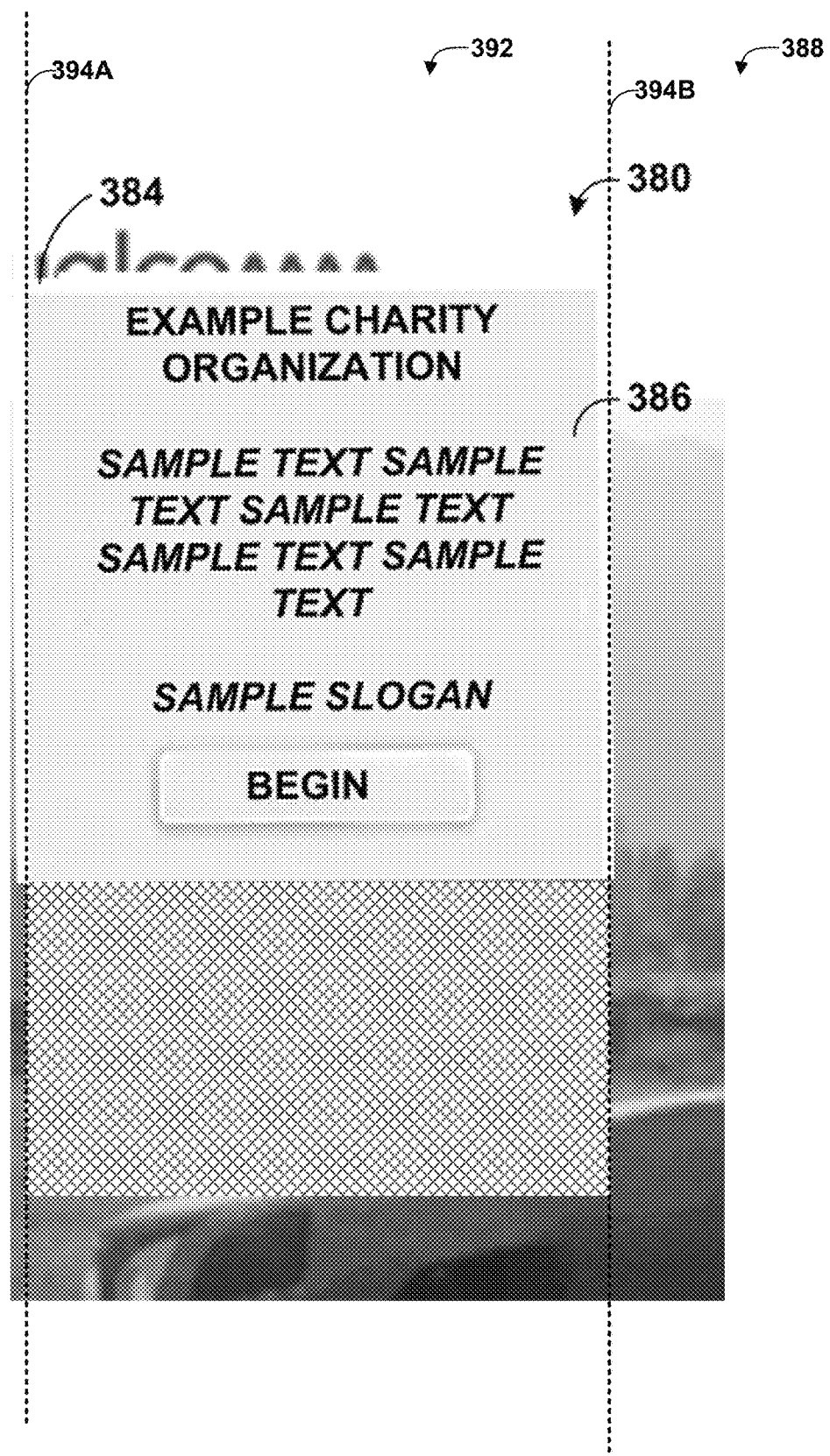
FIG. 14 is a conceptual diagram illustrating an example first stage of an ROI detection process using pilot signals according to the techniques of this disclosure.

FIG. 14 is a conceptual diagram illustrating an example first stage of an ROI detection process using pilot signals according to the techniques of this disclosure. That is, after applying the primary detection process to web page 388 as discussed above with respect to FIGS. 11-13, ROI detection unit 164 may determine that pilot signals exist in web page 388 at positions 394A, 394B, per the results shown in FIG. 13B. That is, the two peaks shown in FIG. 13B that cross threshold T1 may correspond to positions 394A, 394B in FIG. 14, respectively.

Thus, ROI detection unit 164 may proceed to perform the secondary detection process only on region 392 of web page 388 that is within positions 394A, 394B. Accordingly, ROI detection unit 164 may proceed to detect rows of pilot signals in region 392. The same type of analysis as discussed above may be performed for detecting rows and columns, but the column results can be ignored in this instance, because only region 392 of web page 388 is being analyzed and the columns of pilot signal 384 have already been detected.

Figure 15A:
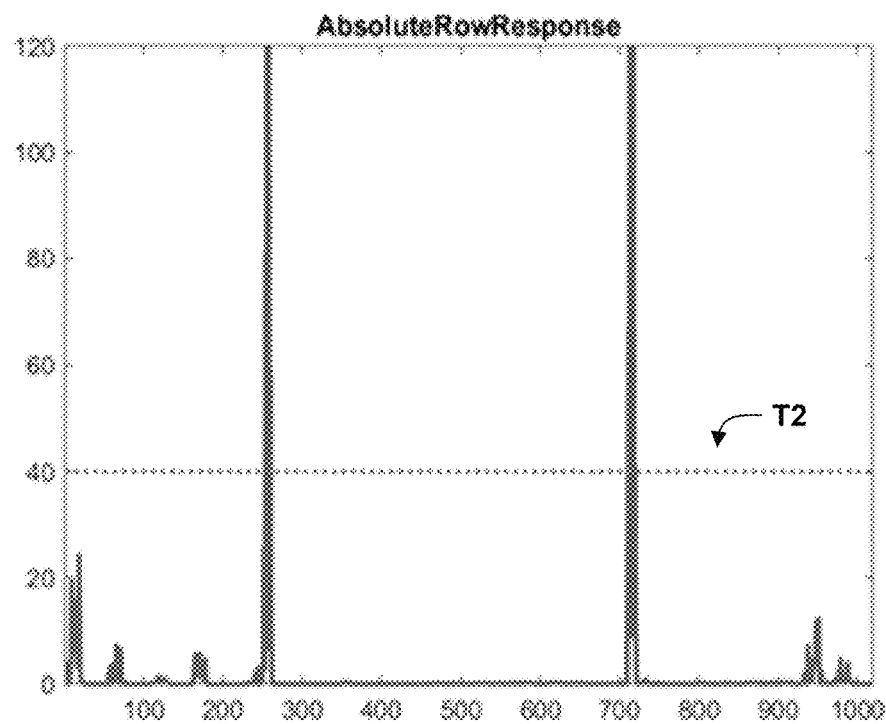
FIGS. 15A and 15B are graphs representing examples of row and column response functions for detecting locations of pilot signals in the example image of FIG. 14 according to the techniques of this disclosure.
Figure 15B:
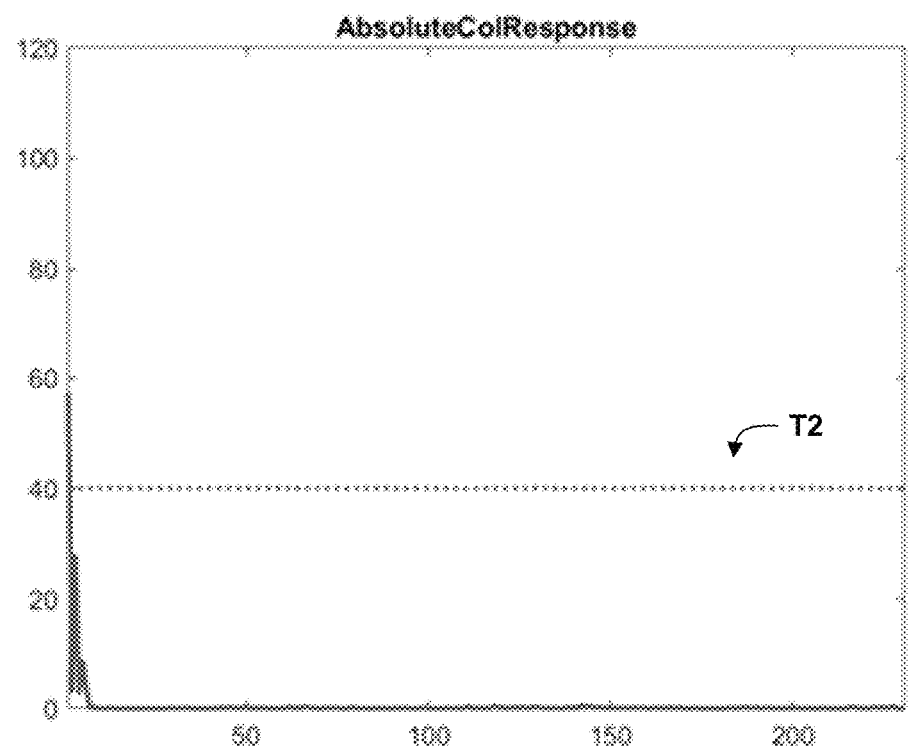

FIGS. 15A and 15B are graphs representing examples of row and column response functions for detecting locations of pilot signals in the example image of FIG. 14 according to the techniques of this disclosure. In this example, FIG. 15A illustrates the row responses, and FIG. 15B illustrates the column responses. As can be seen, there are two peaks in FIG. 15A that exceed threshold T2, which ROI detection unit 164 may determine correspond to rows of pilot signal 384.

Figure 16:
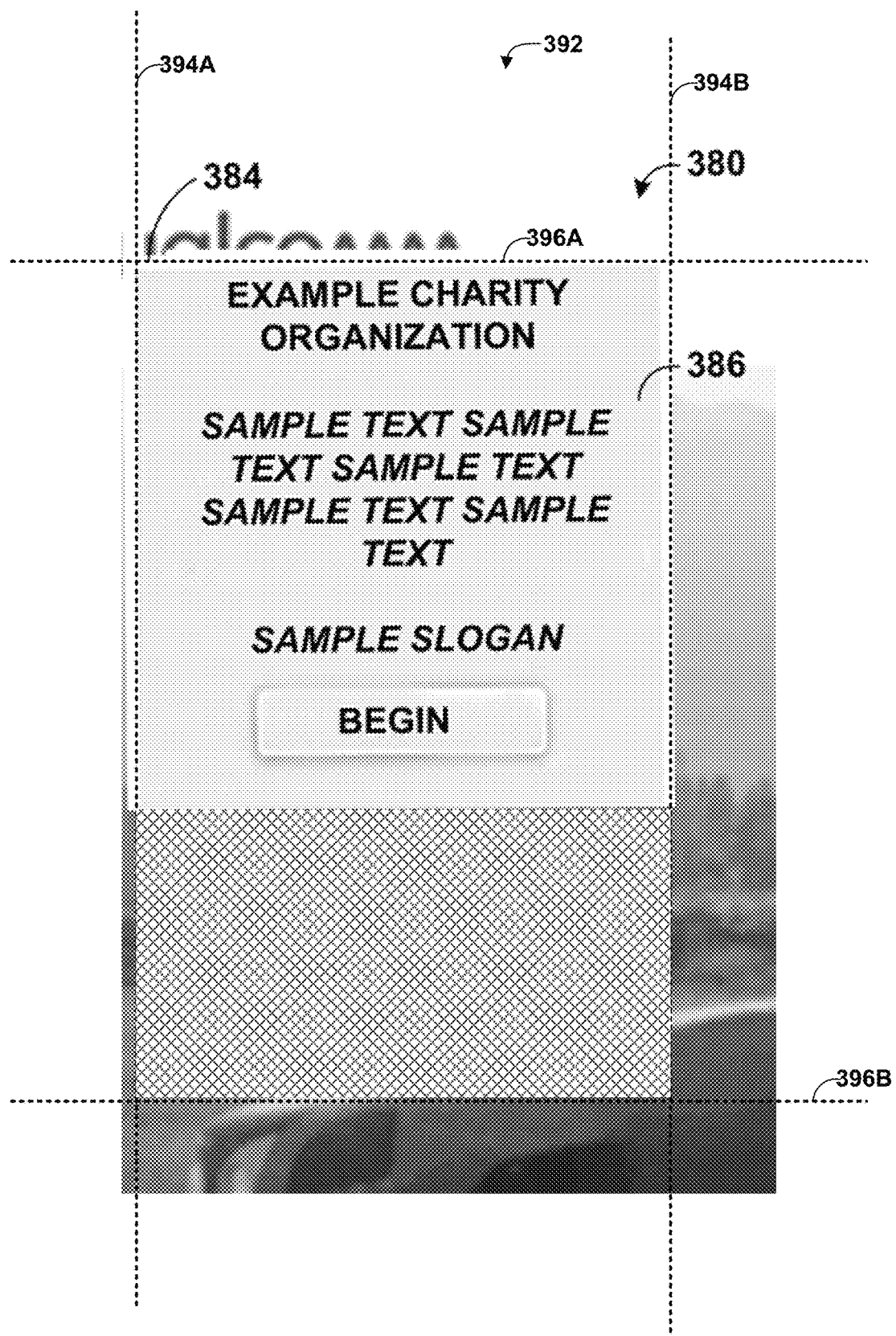
FIG. 16 is a conceptual diagram illustrating an example second stage of the ROI detection process using pilot signals, continuing the example of FIG. 14, according to the techniques of this disclosure.

FIG. 16 is a conceptual diagram illustrating an example second stage of the ROI detection process using pilot signals, continuing the example of FIGS. 11-15, according to the techniques of this disclosure. In FIG. 16, positions 396A and 396B correspond to the peaks shown in the graph of FIG. 15A that exceed threshold T2. Thus, ROI detection unit 164 may determine, using the graph of FIG. 15A, that the rows of pilot signal 384 correspond to the peaks shown in FIG. 15A that exceed threshold T2, i.e., positions 396A and 396B. Thus, ROI detection unit 164 may determine that pilot signal 384 is defined to include rows along positions 396A, 396B and columns along positions 394A, 394B.

The techniques described with respect to FIGS. 12-16 include an example in which ROI detection unit 164 performs two different detection phases having respective threshold values. In the first detection phase, ROI detection unit 164 may process rows and columns of the image to identify a first pair of parallel boundaries in either the rows or the columns of the image having frequency response values exceeding a first threshold. In the second detection phase, ROI detection unit 164 may process either the rows or the columns of a portion of the image between the first pair of parallel boundaries and that are orthogonal to the first pair of parallel boundaries to identify a second pair of parallel boundaries, orthogonal to the first pair of boundaries, having frequency response values exceeding a second threshold. ROI detection unit 164 may then determine that the pilot signal includes the first pair of parallel boundaries and the second pair of parallel boundaries. The pilot signal may include multiple rows and/or columns.

Figure 17:
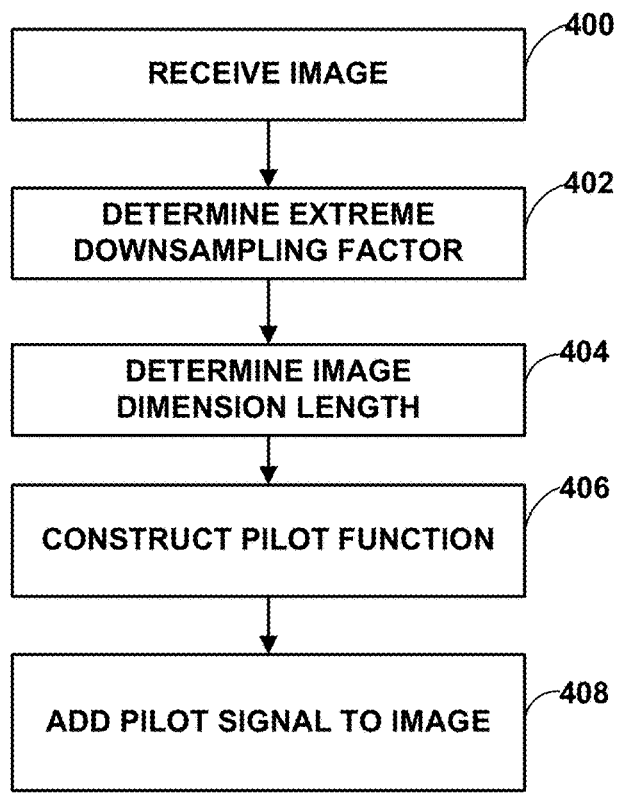
FIG. 17 is a flowchart illustrating an example process for inserting a pilot signal into an image around a region of interest (ROI) of an image according to the techniques of this disclosure.

FIG. 17 is a flowchart illustrating an example process for inserting a pilot signal into an image around a region of interest (ROI) of an image according to the techniques of this disclosure. The method of FIG. 17 is explained with respect to pilot signal generation unit 116 of FIG. 1, although other devices may be configured to perform this or a similar method.

Initially, pilot signal generation unit 116 may receive an image (400), such as one of media assets 112 (FIG. 1), which may be an advertisement (ad) image. Pilot signal generation unit 116 may also determine an extreme downsampling factor (DS) (402). For example, pilot signal generation unit 116 may retrieve DS from configuration data, receive DS from a user (e.g., an administrator), or receive DS from other such sources.

Pilot signal generation unit 116 may then determine a length of a dimension along the image to which the pilot signal is to be added (404). For example, the dimension may be a height or a width of the image, and the length may be the full height or full width of the image. Pilot signal generation unit 116 may then use the length of the dimension, the extreme downsampling value DS, and an amplitude of the pilot signal to construct a pilot function (406), e.g., according to equation (1) above. Alternatively, pilot signal generation unit 116 may further generate 2D or 3D pilot signals using equations (2) and (3) above. Pilot signal generation unit 116 may then add the pilot signal to the image using equations (4)-(7) above.

In this manner, the method of FIG. 17 represents an example of a method of processing image data including processing an image to identify a pilot signal in the image indicating a region of interest (ROI) of the image, the pilot signal forming a boundary around the ROI and having pixel values defined according to a mathematical relationship with pixel values within the ROI such that the pilot signal is not perceptible to a human user and is detectable by a computing device; determining the ROI of the image using the pilot signal; and further processing the ROI to attempt to detect one or more contents of the ROI without attempting to detect the one or more contents of the image in portions of the image outside the ROI.

Figure 18:
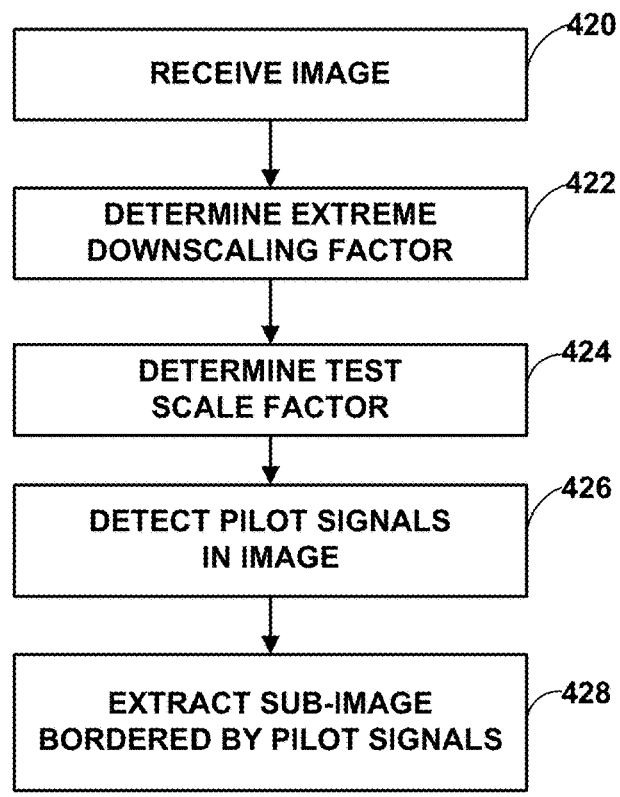
FIG. 18 is a flowchart illustrating an example process for detecting a region of interest (ROI) using pilot signals according to the techniques of this disclosure.

FIG. 18 is a flowchart illustrating an example process for detecting a region of interest (ROI) using pilot signals according to the techniques of this disclosure. The method of FIG. 18 is explained with respect to ROI detection unit 164 of FIG. 2. However, other devices or units may be configured to perform this or a similar method.

Initially, ROI detection unit 164 may receive an image to be processed (420). For example, ROI detection unit 164 may receive the image from composition unit 144 (FIGS. 1 and 2). Alternatively, ROI detection unit 164 may process the image in or extract the image from buffer 148 (FIG. 1).

ROI detection unit 164 may then determine an extreme downscaling factor (DS) (422). The DS value determined by ROI detection unit 164 may be the same as the DS value used by, e.g., pilot signal generation unit 116 (FIG. 1) to construct a pilot signal. For example, data defining the value for DS may be included in the image as metadata, or as side information for the image.

ROI detection unit 164 may also determine a test scale factor (424). ROI detection unit 164 may then use the test scale factor and the extreme downscaling factor DS to detect pilot signals in the image (426). To detect the pilot signals in the image, ROI detection unit 164 may use equations (8)-(18) above. The pilot signals may include a top, bottom, left, and right boundary of an ROI. ROI detection unit 164 may then extract a sub-image (e.g., the ROI) bordered by the pilot signals from the image (428). ROI detection unit 164 may provide the extracted sub-image to another processing element for additional processing, such as watermark extraction unit 138 (FIG. 2).

Figure 19:
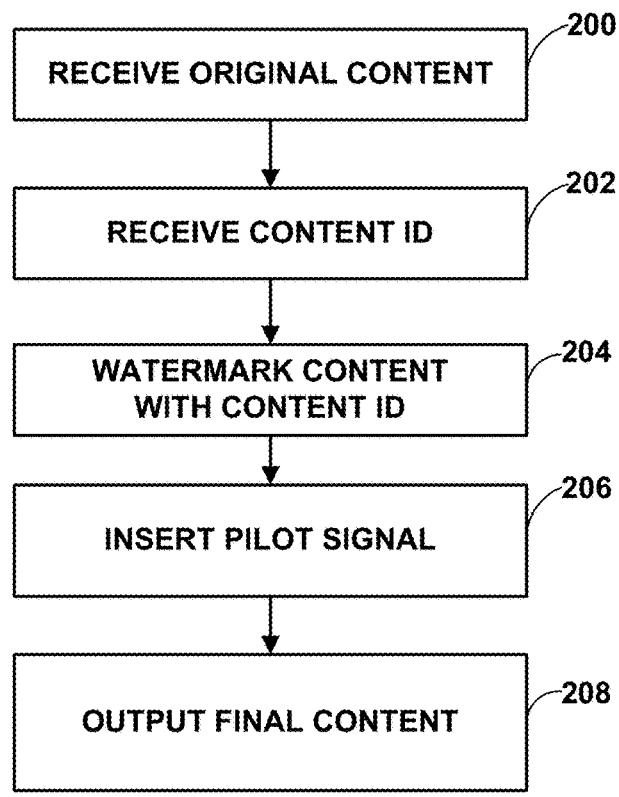
FIG. 19 is an example watermarking process according to certain techniques of this disclosure.

FIG. 19 is an example watermarking process according to the techniques of this disclosure. The process of FIG. 19 is described with respect to watermark unit 114 of FIG. 1, although other devices may be configured to perform this or a similar process.

Initially, watermark unit 114 receives original content (200), e.g., media assets 112 for ads 152. Media assets 112 may include an image or video content (e.g., a series of images or frames). Watermark unit 114 also receives a content identifier (ID) (202). Watermark unit 114 watermarks adds an imperceptible watermark to media assets 112 representing the content ID (204). In some examples, watermark unit 114 may further insert a pilot signal around the watermark (206), e.g., according to the pilot signal generation techniques of this disclosure, such as the techniques described with respect to FIGS. 7, 8, and 17. Like the watermark, the pilot signal may also be imperceptible to human users, but detectable by a computing device. Watermark unit 114 may then output the final content (208), i.e., ads 152 including media assets 112, the watermark representing the content ID, and the pilot signals.

Figure 20:
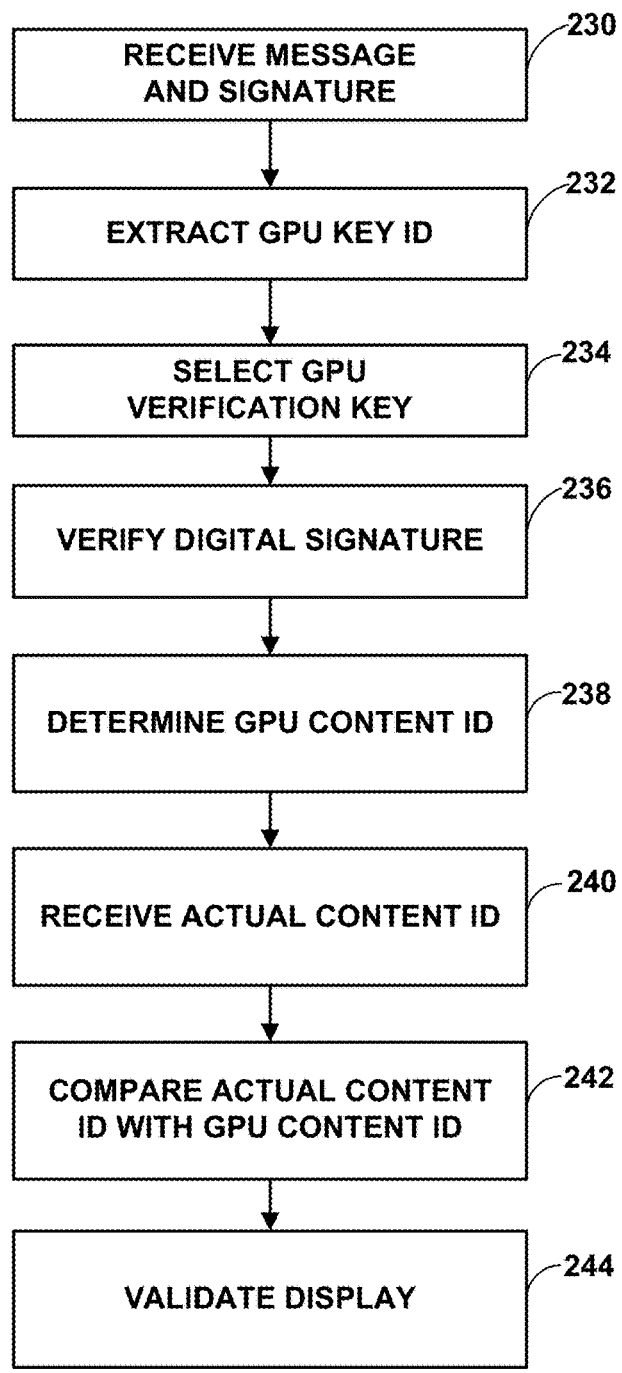
FIG. 20 is a flowchart illustrating an example verification process according to certain techniques of this disclosure.

FIG. 20 is a flowchart illustrating an example verification process according to the techniques of this disclosure. For purposes of example, the verification process of FIG. 20 is described with respect to verification server 120 of FIG. 1. However, other devices, such as ad server 110, may be configured to perform this or a similar process.

As discussed above with respect to FIG. 2, GPU 136 may add a digital signature to form signed message 190 (FIG. 2). Web browser 132 may form report 154 to include signed message 190. Verification server 120 may use the digital signature included in report 154 to validate the contents of a message from GPU 136, which may correspond to a trusted GPU.

Initially, verification server 120 receives report 154 including signed message 190, which itself includes a digital signature (230). Verification server 120 may extract a GPU key identifier (ID) for GPU 136 from report 154 (232). Verification server 120 may then use the GPU key ID to select a GPU verification key (234), e.g., a public key associated with GPU 136. The GPU key ID allows verification server 120 to refresh the GPU verification key used for the digital signature as needed and provides a mechanism by which different GPU models can have different verification keys stored in a public location. Verification server 120 may then verify the digital signature (236), e.g., by decrypting the encrypted content with the public key and comparing the decrypted content with the plain text content of signed message 190.

Assuming that the message is verified as authentic and originating from GPU 136, verification server 120 may determine a GPU-provided content ID (238) from report 154 for a corresponding advertisement. Verification server 120 may also receive an actual content ID for the corresponding advertisement (240). The actual content ID may be received from an external source or may be a predetermined value. Verification server 120 may compare the GPU-provided content ID with the actual content ID (242) to determine whether the IDs match. If the IDs match, verification server 120 may validate display of the corresponding advertisement (244). Verification server 120 may, for example, send data representing the duration of time the advertisement was displayed (using duration data from report 154) to the advertiser and/or to an accounting server. Verification server 120 may also verify that the advertisement was displayed for a sufficient duration, with limited motion, and/or other characteristics.

Certain techniques of this disclosure are summarized in the following clauses.

Clause 1: A method of adding a pilot signal to an image, including: receiving an image; and adding a pilot signal to the image, including: modifying a set of rows and columns on a boundary of the image; specifying at least one color plane; producing a first basis function f(x) for a width of the image; producing a second basis function g(y) for a height of the image; and modifying values of the boundaries of the image and color plane at the boundaries of the image using the first basis function f(x) and the second basis function g(y).

Clause 2: The method of clause 1, where modifying the values includes adding the pilot signal with the image values.

Clause 3: The method of any of clauses 1 and 2, where modifying the values comprises determining a length of an orthogonal kernel function and using values of the orthogonal kernel function to modify a one-dimensional signal producing variation along the orthogonal direction.

Clause 4: The method of any of clauses 1-3, further comprising using color weighting to differently weight the pilot signal in different color planes of the image.

Clause 5: A method of detecting a region of interest in an image, including selecting a test scale factor for an image; constructing one or more one-dimensional test kernels according to an extreme down-sampling factor and the test scale factor; computing a monochrome image using the image and color weight vectors; correlating rows and columns of the monochrome image against test kernels to produce row and column response functions; filtering the row and column response functions using orthogonal weight vectors to produce filtered row and filtered column response functions; computing an amplitude response for each of the filtered row and filtered column response functions, including adding square or alternate phases of kernel functions; comparing the amplitude responses to respective thresholds; determining that rows and columns exceeding the threshold comprise corresponding candidate rows and candidate columns; and forming a list of regions of interests from combined pairs of consecutive rows and consecutive columns of the candidate rows and candidate columns.

Clause 6: The method of clause 5, further comprising clustering the row and column response functions before constructing the candidate rows and candidate columns.

Clause 7: The method of any of clauses 5 and 6, further comprising obtaining a plurality of test scale factors; and performing the method of clause 5 for each of the test scale factors to form a full list of regions of interest (ROIs) for the plurality of test scale factors.

Clause 8: The method of any of clauses 5-7, further comprising performing two-level detection when two detection thresholds, including a primary threshold and a secondary threshold, are selected, comprising: performing a first level of detection on a primary set of rows and columns determined using comparisons of the amplitude responses of the row and column functions to the primary threshold; and performing a second level of detection, comprising obtaining independent first and second sub-elements; in the first sub-element, constructing sub-images according to pairs of primary rows defining tops and bottoms of each of the sub-images; computing absolute response functions for columns on each of the sub-images; comparing the absolute response functions with the secondary threshold to determine a set of columns corresponding to the sub-images; and defining regions of interest (ROIs) from pairs of the primary rows and pairs of the secondary columns; in the second sub-element, constructing sub-images according to pairs of primary columns defining left sides and right sides of each of the sub-images; computing absolute response functions for rows on each of the sub-images; comparing the absolute response functions with the secondary threshold to determine a set of rows corresponding to the sub-images; and defining ROIs from pairs of the primary columns and pairs of the secondary rows.

Clause 9: The primary system operates by generating a unique content ID. Said content ID is then included in a portion of image video content via an invisible watermark. A web page host includes links to said image content. A GPU at a client includes the ability to extract said content ID from said invisible watermark. The GPU creates a report in response to the detection of said watermark. A verification process receives said report and records the visibility of content corresponding to said content ID.

Clause 10: A refinement of Clause 9, in which a digital signature is used to validate the detection by a trusted GPU. Following the creation of the report, the GPU computes a digital signature using a private key and includes said signature with the message content along with an identifier indicating the public verification key. The verification process uses said identifier to select the public varication key and then confirms the validity of said digital signature.

Clause 11: A refinement of Clause 9 and/or Clause 10 in which the content includes a pilot signal in the boundary of the image/video content and a ROI detection process at the GPU detects the pilot signal to identify the presence of said watermark.

Clause 12: A refinement of any of Clauses 9-11, in which tracking is performed to record duration. In response to first detection of a content identifier value, the GPU counts the number of consecutive fames containing the same identifier to compute the duration the content identifier was present on the display buffer of the GPU. The GPU reports a list of content identifier and duration pairs, the verification process determines a match to determine duration.

Clause 13: A refinement of any of Clauses 9-12, in which ROI information is tracked. During the detection process, the location of the sub-image ROI is determined in each frame. This position may be tracked in successive frames to determine a degree of motion or stability of the ROI. For instance, an average of the absolute displacement between frames and analysis frame range may be included in the message produced by the GPU.

Clause 14: A refinement of any of Clauses 9-13, in which the message includes client specific information. The message is formed to include a piece of information unique to the client device. This may be used in combination with the digital signature to prevent duplication of the response message.

Clause 15: A refinement of any of Clauses 9-14, in which there is communication via frame data. The message is communicated from the GPU and client browser or application via a shared portion of memory accessible both by the GPU and JavaScript on the client browser or code on the application.

Clause 16: A refinement of any of Clauses 9-15, in which there is communication via an interface (e.g., an API) on the client device. The message is communicated from the GPU to the client via an API enabling communication among hardware elements of said client.

Clause 17: A refinement of any of Clauses 9-16, in which there is communication between the GPU and a CPU. The GPU operates to collect watermark and viewing information. The GPU message is passed to a CPU. Additional context data may be added that may not be accessible to the GPU. The ad detection data from the GPU and the additional data form the CPU may be sent from the device to a verification server. This additional data may be signed by the CPU to provide verification of the additional data.

Clause 18: A method of verifying display of image content, the method comprising: extracting a watermark from image content to be displayed; determining an identifier for the image content from the watermark; and outputting data representing the identifier.

Clause 19: The method of clause 18, wherein the method is performed by a graphics processing unit (GPU) implemented in circuitry.

Clause 20: The method of any of clauses 18 and 19, further comprising receiving data for the image content from a web browser.

Clause 21: The method of any of clauses 18-20, further comprising outputting the image content to a display device.

Clause 22: The method of any of clauses 18-21, further comprising determining a duration of time the image content including the watermark is displayed, wherein outputting the data further comprises outputting data representing the duration of time.

Clause 23: The method of clause 22, wherein determining the duration of time comprises determining a number of consecutive frames of the image content including the watermark.

Clause 24: The method of any of clauses 22 and 23, wherein the duration of time includes inactive processing time during a panel self refresh (PSR) process.

Clause 25: The method of any of clauses 18-24, wherein extracting the watermark comprises performing region of interest (ROI) detection on the image content to determine a sub-region including the watermark.

Clause 26: The method of any of clauses 18-25, wherein outputting the data comprises: forming a message including the identifier; and signing the message.

Clause 27: The method of clause 26, wherein signing the message comprises signing the message using a key associated with a graphics processing unit (GPU) that determines the identifier.

Clause 28: The method of any of clauses 18-27, further comprising receiving instructions from a web browser to start or stop detection of watermarks in the image content.

Clause 29: The method of any of clauses 18-28, wherein the image content comprises advertisement content.

Clause 30: The method of any of clauses 18-29, wherein extracting the watermark comprises determining a location of the watermark using a pilot signal.

Clause 31: The method of any of clauses 18-30, further comprising determining a location of the watermark in consecutive frames of the image content to determine motion of the image content, wherein outputting the data comprises outputting data representing the determined motion.

Clause 32: A method of verifying display of image data, the method comprising: receiving data from a client device including a client-device determined image content identifier for image content; determining an actual image content identifier for the image content; and verifying that the image content was displayed when the client-device determined image content identifier matches the actual image content identifier.

Clause 33: The method of clause 32, wherein the received data comprises a signature, the method further comprising authenticating the data from the client device using a key for the client device and the signature.

Clause 34: A device comprising one or more means for performing the method of any of clauses 1-33.

Clause 35: The device of clause 34, further comprising a memory.

Clause 36: A computer-readable storage medium having stored thereon instructions that, when executed, cause a processor of a device to perform the method of any of clauses 1-33.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing image data, the method comprising:
processing an image to identify a pilot signal in the image indicating a portion of the image, the pilot signal forming a boundary around the portion and having pixel values defined according to a mathematical relationship with pixel values within the portion such that the pilot signal is not perceptible to a human user and is detectable by a computing device;
determining the portion of the image using the pilot signal; and
further processing the portion to attempt to detect one or more contents of the portion without attempting to detect the one or more contents of the image in portions of the image outside the portion.

2. The method of claim 1, wherein processing the image to identify the pilot signal comprises:
determining a downscaling factor D;
determining a test scale factor T;
calculating a kernel value as being equal to $1/(2*D*T)$; and
calculating at least one of:
a row response value as being equal to one of cos(2*pi*the kernel value*x) or sin(2*pi*the kernel value*x), where x represents a position of the row in the image; or
a column response value as being equal to one of cos(2*pi*the kernel value*y) or sin(2*pi*the kernel value*y), where y represents a position of the column in the image.

3. The method of claim 2, further comprising at least one of:
scaling the row response value $f_1(x)$ according to $$R_p(y) = \frac{1}{W} \cdot \sum_{x=1}^{W} f_1(x) \cdot M(y, x)$$

$p \in [0, 1]$ $y \in [1, H]$;

or
scaling the column response value $f_2(y)$ according to $$C_p(x) = \frac{1}{H} \cdot \sum_{x=1}^{H} f_2(y) \cdot M(y, x)$$

$p \in [0, 1]$ $x \in [1, W]$, wherein W comprises a width of the image, H comprises a height of the image, and M(y,x) comprises the image.

4. The method of claim 3, further comprising:
receiving one or more orthogonal kernel values K; and
at least one of:
filtering the scaled row response value using the orthogonal kernel values K according to $$\widetilde{R_p}(y) = \Sigma_{k=1}^{length(K)} K(1+\text{mod}(y,length(K))) \cdot R_p(y)$$
$p \in [0,1]\ y \in [1, H]$; or filtering the scaled row response value using the orthogonal kernel values K according to $$\widetilde{C_p}(x) = \Sigma_{k=1}^{length(K)} K(1+\text{mod}(x,length(K))) \cdot C_p(x)$$
$p \in [0,1]\ x \in [1, W]$, wherein length(K) comprises a number of values in the orthogonal kernel values K, and wherein mod (a, b) comprises a modulo function that returns a remainder resulting from dividing a by b.

5. The method of claim 4, further comprising computing amplitude values, comprising at least one of:
calculating a row amplitude $A_{row}(y)$ according to $$A_{row}(y) = \Sigma_{p=0}^{1} |\widetilde{R_p}(y)|^2\ y \in [1,H]; \text{ or}$$

calculating a column amplitude $A_{column}(x)$ according to $$A_{column}(x) = \Sigma_{p=0}^{1} |\widetilde{C_p}(x)|^2\ x \in [1,W].$$

6. The method of claim 5, further comprising receiving a threshold value T, and determining at least one of:
that a row r of the image includes part of the pilot signal when $A_{row}(r) > T$; or
that a column c of the image includes part of the pilot signal when $A_{column}(c) > T$.

7. The method of claim 1, wherein the image comprises a monochrome image, further comprising forming the monochrome image from a color image according to $M(y, x) = \Sigma_{c=0}^{3} W(c) \cdot image(y,x,c)$ $y \in [1,H]$ $x \in [1,W]$, wherein M(y, x) comprises a pixel value of the monochrome image at position (y, x), W(c) comprises a color weight value, image(y, x, c) comprises the color image at position (y, x) and for color component c, H comprises a height of the color image, and W comprises a width of the color image.

8. The method of claim 1, wherein processing the image to identify the pilot signal comprises processing the image to identify a top row of the pilot signal, a bottom row of the pilot signal, a left column of the pilot signal, and a right column of the pilot signal.

9. The method of claim 8, wherein processing the image to identify the pilot signal comprises:
determining a downscaling factor D;
determining a test scale factor T;
calculating a kernel value as being equal to $1/(2*D*T)$;
calculating a top row response value as being equal to cos(2*pi*the kernel value*$x_1$), where $x_1$ represents a position of the top row of the pilot signal in the image;
calculating a bottom row response value as being equal to sin(2*pi*the kernel value*$x_2$), where $x_2$ represents a position of the bottom row of the pilot signal in the image;
calculating a left column response value as being equal to cos(2*pi*the kernel value*$y_1$), where $y_1$ represents a position of the left column of the pilot signal in the image; and
calculating a right column response value as being equal to sin(2*pi*the kernel value*$y_2$), where $y_2$ represents a position of the right column of the pilot signal in the image.

10. The method of claim 9, wherein processing the image to identify the pilot signal comprises:
  determining that the top row of the pilot signal is at a position for which the top row response value exceeds a threshold value;
  determining that the bottom row of the pilot signal is at a position for which for the bottom row response value exceeds the threshold value;
  determining that the left column of the pilot signal is at a position for which for the left column response value exceeds the threshold value; and
  determining that the right column of the pilot signal is at a position for which the right column response value exceeds the threshold value.

11. The method of claim 1, wherein processing the image to identify the pilot signal comprises:
  in a first detection phase, processing rows and columns of the image to identify a first pair of parallel boundaries in either the rows or the columns of the image having frequency response values exceeding a first threshold;
  in a second detection phase, processing either the rows or the columns of a portion of the image between the first pair of parallel boundaries and that are orthogonal to the first pair of parallel boundaries to identify a second pair of parallel boundaries, orthogonal to the first pair of boundaries, having frequency response values exceeding a second threshold; and
  determining that the pilot signal comprises the first pair of parallel boundaries and the second pair of parallel boundaries.

12. The method of claim 1, wherein further processing the portion comprises detecting a watermark within the portion.

13. The method of claim 12, further comprising:
  extracting an identifier from the watermark;
  generating a report indicating that image data associated with the identifier has been presented to a user; and
  sending the report to a reporting server.

14. The method of claim 1, wherein the portion of the image comprises a region of interest (ROI) of the image.

15. A device for processing image data, the device comprising:
  a memory configured to store an image; and
  one or more processors implemented in circuitry and configured to:
    process the image to identify a pilot signal in the image indicating a portion of the image, the pilot signal forming a boundary around the portion and having pixel values defined according to a mathematical relationship with pixel values within the portion such that the pilot signal is not perceptible to a human user and is detectable by the device;
    determine the portion of the image using the pilot signal; and
    further process the portion to attempt to detect one or more contents of the portion without attempting to detect the one or more contents of the image in portions of the image outside the portion.

16. The device of claim 15, wherein to process the image to identify the pilot signal, the one or more processors are configured to:
  determining a downscaling factor D;
  determining a test scale factor T;
  calculating a kernel value as being equal to 1/(2*D*T); and
  calculating at least one of:
    a row response value as being equal to one of cos(2*pi*the kernel value*x) or sin(2*pi*the kernel value*x), where x represents a position of the row in the image; or
    a column response value as being equal to one of cos(2*pi*the kernel value*y) or sin(2*pi*the kernel value*y), where y represents a position of the column in the image.

17. The device of claim 16, wherein the one or more processors are further configured to:
  scaling the row response value $f_1(x)$ according to $$R_p(y) = \frac{1}{W} \cdot \sum_{x=1}^{W} f_1(x) \cdot M(y, x)$$

$p \in [0, 1]$ $y \in [1, H]$;

or
  scaling the column response value $f_2(y)$ according to $$C_p(x) = \frac{1}{H} \cdot \sum_{x=1}^{H} f_2(y) \cdot M(y, x)$$

$p \in [0, 1]$ $x \in [1, W]$, wherein W comprises a width of the image, H comprises a height of the image, and M(y,x) comprises the image.

18. The device of claim 17, wherein the one or more processors are further configured to:
  receive one or more orthogonal kernel values K; and
  at least one of:
    filtering the scaled row response value using the orthogonal kernel values K according to
    $\widetilde{R_p}(y) = \Sigma_{k=1}^{length(K)} K(1+mod(y,length(K)) \cdot R_p(y)$
    $p \in [0,1]$ $y \in [1, H]$; or
    filtering the scaled row response value using the orthogonal kernel values K according to
    $\widetilde{C_p}(x) = \Sigma_{k=1}^{length(K)} K(1+mod(x,length(K)) \cdot C_p(x)$
    $p \in [0,1]$ $x \in [1, W]$ wherein length(K) comprises a number of values in the orthogonal kernel values K, and wherein mod (a, b) comprises a modulo function that returns a remainder resulting from dividing a by b.

19. The device of claim 18, wherein the one or more processors are further configured to compute one or more amplitude values according to at least one of:
  a row amplitude $A_{row}(y)$ according to
  $A_{row}(y) = \Sigma_{p=0}^{1} |\widetilde{R_p}(y)|^2$ $y \in [1,H]$; or
  a column amplitude $A_{column}(x)$ according to
  $A_{column}(x) = \Sigma_{p=0}^{1} |\widetilde{C_p}(x)|^2$ $x \in [1,W]$.

20. The device of claim 19, wherein the one or more processors are further configured to receive a threshold value T and determine at least one of:
  that a row r of the image includes part of the pilot signal when $A_{row}(r) > T$; or
  that a column c of the image includes part of the pilot signal when $A_{column}(c) > T$.

21. The device of claim 15, wherein the image comprises a monochrome image, and wherein the one or more processors are further configured to form the monochrome image from a color image according to $M(y,x)=\Sigma_{c=0}^{3} W(c) \cdot \text{image}(y,x,c)$ $y \in [1,H]$ $x \in [1,W]$, wherein M(y, x) comprises a pixel value of the monochrome image at position (y, x), W(c) comprises a color weight value, image(y, x, c) comprises the color image at position (y, x) and for color component c, H comprises a height of the color image, and W comprises a width of the color image.

22. The device of claim 15, wherein the one or more processors are configured to process the image to identify a top row of the pilot signal, a bottom row of the pilot signal, a left column of the pilot signal, and a right column of the pilot signal.

23. The device of claim 22, wherein to process the image to identify the pilot signal, the one or more processors are configured to:
determine a downscaling factor D;
determine a test scale factor T;
calculate a kernel value as being equal to 1/(2*D*T);
calculate a top row response value as being equal to cos(2*pi*the kernel value*$x_1$), where $x_1$ represents a position of the top row of the pilot signal in the image;
calculate a bottom row response value as being equal to sin(2*pi*the kernel value*$x_2$), where $x_2$ represents a position of the bottom row of the pilot signal in the image;
calculate a left column response value as being equal to cos(2*pi*the kernel value*$y_1$), where $y_1$ represents a position of the left column of the pilot signal in the image; and
calculate a right column response value as being equal to sin(2*pi*the kernel value*$y_2$), where $y_2$ represents a position of the right column of the pilot signal in the image.

24. The device of claim 23, wherein to process the image to identify the pilot signal, the one or more processors are configured to:
determine that the top row of the pilot signal is at a position for which the top row response value exceeds a threshold value;
determine that the bottom row of the pilot signal is at a position for which for the bottom row response value exceeds the threshold value;
determine that the left column of the pilot signal is at a position for which for the left column response value exceeds the threshold value; and
determine that the right column of the pilot signal is at a position for which the right column response value exceeds the threshold value.

25. The device of claim 15, wherein to process the image to identify the pilot signal, the one or more processors are configured to:
in a first detection phase, process rows and columns of the image to identify a first pair of parallel boundaries in either the rows or the columns of the image having frequency response values exceeding a first threshold;
in a second detection phase, process either the rows or the columns of a portion of the image between the first pair of parallel boundaries and that are orthogonal to the first pair of parallel boundaries to identify a second pair of parallel boundaries, orthogonal to the first pair of boundaries, having frequency response values exceeding a second threshold; and
determine that the pilot signal comprises the first pair of parallel boundaries and the second pair of parallel boundaries.

26. The device of claim 15, wherein the one or more processors are further configured to detect a watermark within the portion.

27. The device of claim 26, wherein the one or more processors are further configured to:
extract an identifier from the watermark;
generate a report indicating that image data associated with the identifier has been presented to a user; and
send the report to a reporting server.

28. A device for processing image data, the device comprising:
means for processing an image to identify a pilot signal in the image indicating a portion of the image, the pilot signal forming a boundary around the portion and having pixel values defined according to a mathematical relationship with pixel values within the portion such that the pilot signal is not perceptible to a human user and is detectable by a computing device;
means for determining the portion of the image using the pilot signal; and
means for further processing the portion to attempt to detect one or more contents of the portion without attempting to detect the one or more contents of the image in portions of the image outside the portion.

29. A computer-readable storage medium having stored thereon instructions that, when executed, cause a processor of a device for decoding video data to:
process an image to identify a pilot signal in the image indicating a portion of the image, the pilot signal forming a boundary around the portion and having pixel values defined according to a mathematical relationship with pixel values within the portion such that the pilot signal is not perceptible to a human user and is detectable by a computing device;
determine the portion of the image using the pilot signal; and
further process the portion to attempt to detect one or more contents of the portion without attempting to detect the one or more contents of the image in portions of the image outside the portion.

30. A method of processing data, the method comprising:
determining pixel values of an image at a boundary around the image; and
processing the image to add a pilot signal at the boundary around the image, the pilot signal having pixel values defined according to a mathematical relationship with the pixel values of the sub-image such that the pilot signal is not perceptible to a human user and is detectable by a computing device.

31. The method of claim 30, wherein processing the image to add the pilot signal comprises:
determining an amplitude for the pilot signal;
determining a downscaling factor, the downscaling factor representing an amount of downscaling that can be applied to the image without degrading the pilot signal;
determining a length of a row or column of the boundary around the image; and
constructing the pilot signal for the row or column using the amplitude, the downscaling factor, and the length.

32. The method of claim 31, wherein constructing the pilot signal for the row or column ($f_{narrowband}(x)$) comprises constructing the pilot signal according to $f_{narrow\ band}(x) = \text{Amplitude}_{pilot} \cdot \cos(2 \cdot pi \cdot F_{pilot} \cdot x)$, $$F_{pilot} = \frac{1}{2 \cdot D},$$

$x \in [1, \text{Length}]$, wherein Amplitude$_{pilot}$ comprises the amplitude for the pilot signal, D comprises the downscaling factor, Length comprises the length of the row or column, and x represents a position along the row or column.

33. The method of claim 32, further comprising receiving an upscaling factor, wherein constructing the pilot signal comprises constructing a dual sinusoid additionally using the upscaling factor.

34. The method of claim 31, further comprising:
receiving an orthogonal dimension kernel having a plurality of values, the orthogonal dimension kernel being orthogonal to the row or column; and
receiving a color plane weight function for weighting respective color components of the image,
wherein constructing the pilot signal for the row or column comprises constructing respective pilot signal components for each of the color components of the image using the orthogonal dimension kernel and the color weight function.

35. The method of claim 34, wherein constructing the pilot signal comprises at least one of:
when constructing the pilot signal for the row:
constructing a one-dimensional row pilot signal $p_{1D}^{row}$(y,x) according to Amplitude$_{pilot}$·cos(2·pi·F$_{pilot}$·x), $$F_{pilot} = \frac{1}{2 \cdot D},$$

x∈[1,Length], wherein Amplitude$_{pilot}$ comprises the amplitude for the pilot signal, D comprises the downscaling factor, Length comprises the length of the row, and x represents a position along the row;
constructing a two-dimensional row pilot signal $P_{2D}^{row}$(y,x) according to $P_{1D}^{row}$(x)·K(y) y∈[1,K] x∈[1,Length], wherein K( ) comprises the orthogonal dimension kernel and K comprises a number of values in the orthogonal dimension kernel; and
constructing a three-dimensional row pilot signal $P_{3D}^{row}$(y,x,c) according to $P_{2D}^{row}$(y,x)·W(c) y∈[1,K] x∈[1,Length] c∈[1,3], wherein W represents the color plane weight function and c represents a current one of the color components; or
when constructing the pilot signal for the column:
constructing a one-dimensional column pilot signal $p_{1D}^{col}$(y,x) according to Amplitude$_{pilot}$·cos (2·pi·F$_{pilot}$·x), $$F_{pilot} = \frac{1}{2 \cdot D},$$

x∈[1,Length], wherein Length comprises the length of the column, and x represents a position along the column;
constructing a two-dimensional column pilot signal $P_{2D}^{col}$(y,x) according to $p_{1D}^{col}$(x)·K(y) y∈[1,K] x∈[1,Length]; and
constructing a three-dimensional column pilot signal $P_{3D}^{col}$(y,x,c) according to $P_{2D}^{col}$(y,x)·W(c) y∈[1,K] x∈[1,Length] c∈[1,3].

36. The method of claim 35, wherein processing the image to add the pilot signal comprises:
adding a top row pilot signal to a top row of the boundary around the image according to image(y,x,c)+$P_{3D}^{row}$(y,x,c) y∈[1, K] x∈[1,W] c∈[1,3], wherein image(y,x,c) comprises one of the color components of the image;
adding a bottom row pilot signal to a bottom row of the boundary around the image according to image(y,x,c)+$P_{3D}^{row}$(y−(H−K),x,c), y∈[(H−K)+1,H] x∈[1,W] c∈[1, 3];
adding a left column pilot signal to a left column of the boundary around the image according to image(y,x,c)+$P_{3D}^{col}$(y,x,c), y∈[1,H] x∈[1, K] c∈[1,3]; and
adding a right column pilot signal to a right column of the boundary around the image according to image (y,x, c)+$P_{3D}^{col}$(y,x−(W−K),c), y∈[1,H] x∈[(W−K)+1,W] c∈[1,3].

37. A device for processing image data, the device comprising:
a memory configured to store data for an image; and
one or more processors implemented in circuitry and configured to:
determine pixel values of an image at a boundary around the image; and
process the image to add a pilot signal at the boundary around the image, the pilot signal having pixel values defined according to a mathematical relationship with the pixel values of the sub-image such that the pilot signal is not perceptible to a human user and is detectable by a computing device.

38. A device for processing image data, the device comprising:
means for determining pixel values of an image at a boundary around the image; and
means for processing the image to add a pilot signal at the boundary around the image, the pilot signal having pixel values defined according to a mathematical relationship with the pixel values of the sub-image such that the pilot signal is not perceptible to a human user and is detectable by a computing device.

39. A computer-readable storage medium having stored thereon instructions that, when executed, cause a processor of a device for encoding video data to:
determine pixel values of an image at a boundary around the image; and
process the image to add a pilot signal at the boundary around the image, the pilot signal having pixel values defined according to a mathematical relationship with the pixel values of the sub-image such that the pilot signal is not perceptible to a human user and is detectable by a computing device.

* * * * *